United States Patent
Black et al.

(10) Patent No.: US 8,265,450 B2
(45) Date of Patent: Sep. 11, 2012

(54) CAPTURING AND INSERTING CLOSED CAPTIONING DATA IN DIGITAL VIDEO

(75) Inventors: David Robert Black, Sunnyvale, CA (US); Marshall Johnson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 785 days.

(21) Appl. No.: 12/355,746

(22) Filed: Jan. 16, 2009

(65) Prior Publication Data

US 2010/0183278 A1   Jul. 22, 2010

(51) Int. Cl.
*H04N 9/80* (2006.01)
*H04N 5/92* (2006.01)

(52) U.S. Cl. ........................................ 386/239; 386/245

(58) Field of Classification Search ................. 386/232, 386/239, 240, 245, 278, 281
See application file for complete search history.

(56) References Cited

U.S. PATENT DOCUMENTS

| | | | |
|---|---|---|---|
| 5,572,261 A | 11/1996 | Cooper | |
| 5,640,202 A | 6/1997 | Kondo et al. | |
| 6,034,746 A | 3/2000 | Desai et al. | |
| 6,184,937 B1 | 2/2001 | Williams et al. | |
| 6,243,032 B1 | 6/2001 | Uramoto et al. | |
| 6,385,240 B2 | 5/2002 | Nishio | |
| 6,904,566 B2 | 6/2005 | Feller et al. | |
| 6,968,564 B1 | 11/2005 | Srinivasan | |
| 7,023,486 B2 | 4/2006 | Takayama | |
| 7,024,097 B2 | 4/2006 | Sullivan | |
| 7,142,250 B1 | 11/2006 | Black | |
| 2002/0118296 A1 | 8/2002 | Schwab et al. | |
| 2003/0049015 A1 | 3/2003 | Cote et al. | |
| 2003/0170010 A1 | 9/2003 | Wang et al. | |
| 2004/0114904 A1 | 6/2004 | Sun et al. | |
| 2004/0120554 A1 | 6/2004 | Lin et al. | |
| 2004/0122662 A1 | 6/2004 | Crockett | |
| 2005/0273321 A1 | 12/2005 | Choi | |
| 2007/0092200 A1 | 4/2007 | Black | |
| 2008/0109415 A1* | 5/2008 | Yabe et al. | 707/3 |
| 2009/0185790 A1* | 7/2009 | Kim | 386/95 |

OTHER PUBLICATIONS

Non-Final Office Action of U.S. Appl. No. 10/407,954, Apr. 4, 2006 (mailing date), Black, David R.
Notice of Allowance of U.S. Appl. No. 10/407,954, Jul. 20, 2006 (mailing date), Black, David R.
U.S. Appl. No. 10/732,609, filed Dec. 9, 2003, Black, David R.
U.S. Appl. No. 10/732,708, filed Dec. 9, 2003, Black, David R.
Non-Final Office Action of U.S. Appl. No. 10/732,708, Jul. 23, 2007 (mailing date), Black, David R.
Final Office Action of U.S. Appl. No. 10/732,708, Feb. 25, 2008 (mailing date), Black, David R.
Non-Final Office Action of U.S. Appl. No. 10/732,708, May 29, 2008 (mailing date), Black, David R.
Non-Final Office Action of U.S. Appl. No. 10/732,708, Feb. 19, 2009 (mailing date), Black, David R.

* cited by examiner

*Primary Examiner* — Robert Chevalier
(74) *Attorney, Agent, or Firm* — Adeli & Tollen LLP

(57) ABSTRACT

Some embodiments of the invention provide a novel method for processing a high definition ("HD") digital video that includes video data and closed captioning data. The method (i) imports an HD digital video in a computer system, (ii) extracts closed captioning data from the HD digital video and (iii) stores the extracted closed captioning data in a storage of the computer system (e.g., hard drive of the computer system). Some embodiments first import all of the video before extracting closed captioning data from it, while other embodiments extract closed captioning data from the video as they import the video into the computer system. In some embodiments, a video editing application of a computer system performs this HD-video processing method. Accordingly, in some such cases, the method also edits the video that is extracted from the HD digital video. In addition, when video data is edited, the extracted closed captioning data is also edited in some embodiments.

44 Claims, 27 Drawing Sheets

```xml
<?xml version="1.0" encoding="UTF-8" ?>
<!DOCTYPE xmeml (View Source for full doctype...)>
<xmeml version="5">
  <sequence id="Sequence 1">
    <name>Sequence 1</name>
    <duration>73</duration>
    <rate>
      <ntsc>TRUE</ntsc>
      <timebase>30</timebase>
    </rate>
    <timecode>
      <string>01:00:00;00</string>
    </timecode>
    <media>
      <video>
        <track>
          <clipitem id="Clip1">
            <name>Clip1</name>
            <duration>64</duration>
            <rate>
              <ntsc>TRUE</ntsc>
              <timebase>30</timebase>
            </rate>
            <in>0</in>
            <out>44</out>
            <file id="Clip1">
              <name>Clip1.mov</name>
              <pathurl>file://localhost/Volumes/DiskNum1/FCPDocs/CaptureScratch/Project1/Clip1.mov</pathurl>
              <duration>64</duration>
              <media>
                <video>
                  <duration>64</duration>
                  <samplecharacteristics>
                    <width>720</width>
                    <height>486</height>
                  </samplecharacteristics>
                </video>
              </media>
            </file>
          </clipitem>
          <transitionitem>
            <rate>
              <ntsc>TRUE</ntsc>
              <timebase>30</timebase>
            </rate>
            <start>36</start>
            <end>44</end>
            <alignment>center</alignment>
            <effect>
              <effectid>Cross Dissolve</effectid>
              <effectcategory>Dissolve</effectcategory>
              <effecttype>transition</effecttype>
              <mediatype>video</mediatype>
            </effect>
          </transitionitem>
```

*Figure 9a*

```xml
- <clipitem id="Clip2">
    <name>Clip2</name>
    <duration>47</duration>
    - <rate>
        <ntsc>TRUE</ntsc>
        <timebase>30</timebase>
    </rate>
    <in>13</in>
    <out>24</out>
    - <file id="Clip2 2">
        <name>Clip2.mov</name>
        <pathurl>file://localhost/Volumes/DiskNum1/FCPDocs/CaptureScratch/Project1/Clip2.mov</pathurl>
        - <rate>
            <timebase>30</timebase>
            <ntsc>TRUE</ntsc>
        </rate>
        <duration>47</duration>
        - <metadata>
            <storage>QuickTime</storage>
            <key>com.apple.finalcutstudio.media.uuid</key>
            <size>36</size>
            <type>UTF8</type>
            <value>297F568F-D7F8-466D-BD75-BDF88E6F9E8B</value>
        </metadata>
        - <media>
            - <video>
                <duration>47</duration>
                - <samplecharacteristics>
                    <width>720</width>
                    <height>486</height>
                </samplecharacteristics>
            </video>
        </media>
    </file>
</clipitem>
- <clipitem id="Clip3">
    <name>Clip3</name>
    <duration>63</duration>
    - <rate>
        <ntsc>TRUE</ntsc>
        <timebase>30</timebase>
    </rate>
    <in>14</in>
    <out>40</out>
    - <file id="Clip3">
        <name>Clip3.mov</name>
        <pathurl>file://localhost/Volumes/DiskNum1/FCPDocs/CaptureScratch/Project1/Clip3.mov</pathurl>
        - <rate>
            <timebase>30</timebase>
            <ntsc>TRUE</ntsc>
        </rate>
        <duration>63</duration>
        - <media>
            - <video>
                <duration>63</duration>
                - <samplecharacteristics>
                    <width>720</width>
                    <height>486</height>
                </samplecharacteristics>
            </video>
        </media>
    </file>
</clipitem>
</track>
</video>
</media>
</sequence>
</xmeml>
```

CAPTURING AND INSERTING CLOSED CAPTIONING DATA IN DIGITAL VIDEO

FIELD OF THE INVENTION

The invention is directed towards closed captioning ("CC") in video. Specifically, the invention is directed towards capturing and inserting closed captioning information in video.

BACKGROUND OF THE INVENTION

Closed captioning is a textual representation of spoken dialog in video that is transmitted by many video systems or provided in pre-recorded videos (e.g., DVD). In standard definition video (e.g., 480i, 480p), closed captioning is typically encoded into the image portion of the video. Specifically, closed captioning is stored in a non-visible line of the standard definition video signal (typically line 21 of the video signal). Thus, closed captioning data is part of the image data in standard definition video signals.

In recent years, high definition ("HD") videos (e.g., 720p, 1080i, 1080p) have become popular due to the enhanced image quality of the video signal over standard definition video signals. Like standard definition videos, HD videos can also include closed captioning data. However, closed captioning data is stored and processed differently in HD videos than in standard definition videos.

Given the recent popularity of HD videos, video editing applications on the market are not designed to fully process HD video, especially HD video with closed captioning data. Digital graphic design, video editing, and media editing applications provide designers and artists with tools to create much of the media seen today through various media outlets (television, movies, Internet content, etc.). These tools allow designers the ability to generate, compose, composite, and animate images and videos.

With the increasing popularity of HD videos, there is a need for digital graphic design, video editing, and media editing applications that can process and edit HD video. Preferably, these applications will also be able to process closed captioning data for these HD videos. HD video comes in different formats, such as DV 25, DV50, DV100 and ProRes. These design and editing applications should ideally be able to support as many of the formats as possible.

SUMMARY OF THE INVENTION

Some embodiments of the invention provide a novel method for processing a high definition ("HD") digital video (i.e., a sequence of digital video pictures) that includes video data and closed captioning data (e.g., closed captioning text that is to be displayed with a particular set of digital video pictures). The method (i) imports an HD digital video in a computer system, (ii) extracts closed captioning data from the HD digital video and (iii) stores the extracted closed captioning data in a storage of the computer system (e.g., a hard drive of the computer system). Some embodiments first import all of the video before extracting closed captioning data from it, while other embodiments extract closed captioning data from the video as they import the video into the computer system (e.g., by extracting closed captioning data from a particular digital video picture as the particular digital video picture is imported).

Some embodiments perform this method when video is downloaded onto the computer system from a source (e.g., a computer, storage, etc.) that remotely connects to the computer (e.g., through a network, such as a local area network, a wide area network, a network of networks, the Internet, etc.). Alternatively or conjunctively, some embodiments automatically perform this method when another device (e.g., a camera or external storage) that stores the video directly connects to the computer system. For instance, in some such embodiments, the computer system (1) automatically detects the connection of the other device, (2) prompts the user of the computer system with a notification that asks whether it should import the video into the computer system, and then (3) imports the video only after receiving the user's acceptance.

In addition to the closed captioning data mentioned above, the imported HD digital video of some embodiments also includes metadata (e.g., timecode) that indicates when particular closed captioning data is to be displayed or with which video the closed captioning data is to be displayed (e.g., that the particular closed captioning data is to be displayed when a particular set of video pictures are displayed). Accordingly, when closed captioning data is retrieved and stored, the method of some embodiments also retrieves and stores the metadata for each closed captioning data. In other embodiments, metadata is generated when the closed captioning data is extracted.

In some embodiments, the HD digital video data is also associated with metadata (e.g., timecode) that indicates when the video is displayed. For instance, in some embodiments, each digital video picture includes a timecode. In some embodiments, the metadata for the video data is extracted from the HD digital video. In other embodiments, the metadata is generated when video data is extracted from the HD digital video.

Some embodiments of processing HD digital video are performed by a video editing application of a computer system. Accordingly, in some such cases, the method also edits the video data that is extracted from the HD digital video. In some embodiments, editing video data includes (i) combining the video with other video and/or audio clips, (ii) deleting parts of the imported video (e.g., removing frames from the imported video), (iii) changing the temporal position of at least one video picture (e.g., one frame) in the sequence of pictures that make up the imported video, (iv) adding special effects to the imported video, (v) changing visual attributes (e.g., luminance, chrominance) of the imported video, and (vi) generating new video (e.g., new video pictures).

In some cases when video data is edited (e.g., changing the temporal position of at least one digital video picture), changes are made to the metadata associated with the video data in some embodiments. For example, when video is edited to be displayed at a later time, the metadata is changed to reflect the new display time of the video. In some embodiments, the metadata is changed automatically by the video editing application as the video is edited.

When video data is edited, the extracted closed captioning data is also edited in some embodiments. For instance, when temporal positions of video pictures are changed, the closed captioning data may also need to be edited. The editing of the closed captioning data is performed by an application that is separate and external to the video editing application in some embodiments. When the editing of the closed captioning data is performed by such an external application, the method further generates metadata related to the changes made to the video data. In some embodiments, the generated metadata specifies the differences between the imported video data and the edited video data to the external application (e.g., the differences between the timecodes of the imported video data and edited video data) so that the external application can properly edit the closed captioning data.

In some embodiments, the external application edits the closed captioning data based on the generated metadata. After the editing of the closed captioning data by the external application, the edited closed captioning data is received by a video editing application. Once the edited closed captioning data is received, the method merges the edited closed captioning data with the edited video data to generate a new HD digital video stream that can be outputted to a device.

In some embodiments, the merging of the edited closed captioning data and edited video data is performed by inserting edited closed captioning data with the edited video data to produce the new HD digital video stream. To ensure that closed captioning data is inserted with a proper video picture of the HD digital video, some embodiments define a mapping relationship between the edited closed captioning data and the edited video data. The mapping relationship of some embodiments defines, for each particular closed captioning data, a particular video picture in which the particular closed captioning data will be inserted with when an HD digital video is outputted. In some embodiments, the mapping relationship is stored as a memory array. Different embodiments may define the mapping relationship differently.

BRIEF DESCRIPTION OF THE DRAWINGS

The novel features of the invention are set forth in the appended claims. However, for purpose of explanation, several embodiments of the invention are set forth in the following figures.

FIGS. 9a-9b illustrate an example of an XML file in some embodiments of the invention.

DETAILED DESCRIPTION OF THE INVENTION

In the following description, numerous details are set forth for purpose of explanation. However, one of ordinary skill in the art will realize that the invention may be practiced without the use of these specific details. For instance, much of the discussion below relates to processing high definition digital video. However, one of ordinary skill will recognize that similar techniques as those described can be used to process standard definition digital video.

I. Overview

Some embodiments of the invention provide a novel method for processing a high definition ("HD") digital video (i.e., a sequence of digital video pictures) that includes video data and closed captioning data (e.g., closed captioning text that is to be displayed with a particular set of digital video pictures). The method (i) imports an HD digital video in a computer system, (ii) extracts closed captioning data from the HD digital video and (iii) stores the extracted closed captioning data in a storage of the computer system (e.g., a hard drive of the computer system). Some embodiments first import all of the video before extracting closed captioning data from it, while other embodiments extract closed captioning data from the video as they import the video into the computer system (e.g., by extracting closed captioning data from a particular digital video picture as the particular digital video picture is imported).

In some embodiments, the HD digital video processing is performed by a video editing application of a computer system. Accordingly, in some such cases, the method also edits the video that is extracted from the HD digital video. When video data is edited, the extracted closed captioning data is also edited in some embodiments. For instance, when temporal positions of video pictures are changed, the closed captioning data may also need to be edited. The editing of the closed captioning data is performed by an application that is separate and external to the video editing application in some embodiments. After the editing of the closed captioning data by the external application, the edited closed captioning data is received by a video editing application. Once the edited closed captioning data is received, some embodiments merge the edited closed captioning data with the edited video data to generate a new HD digital video stream that can be outputted to a device.

Figure 1:
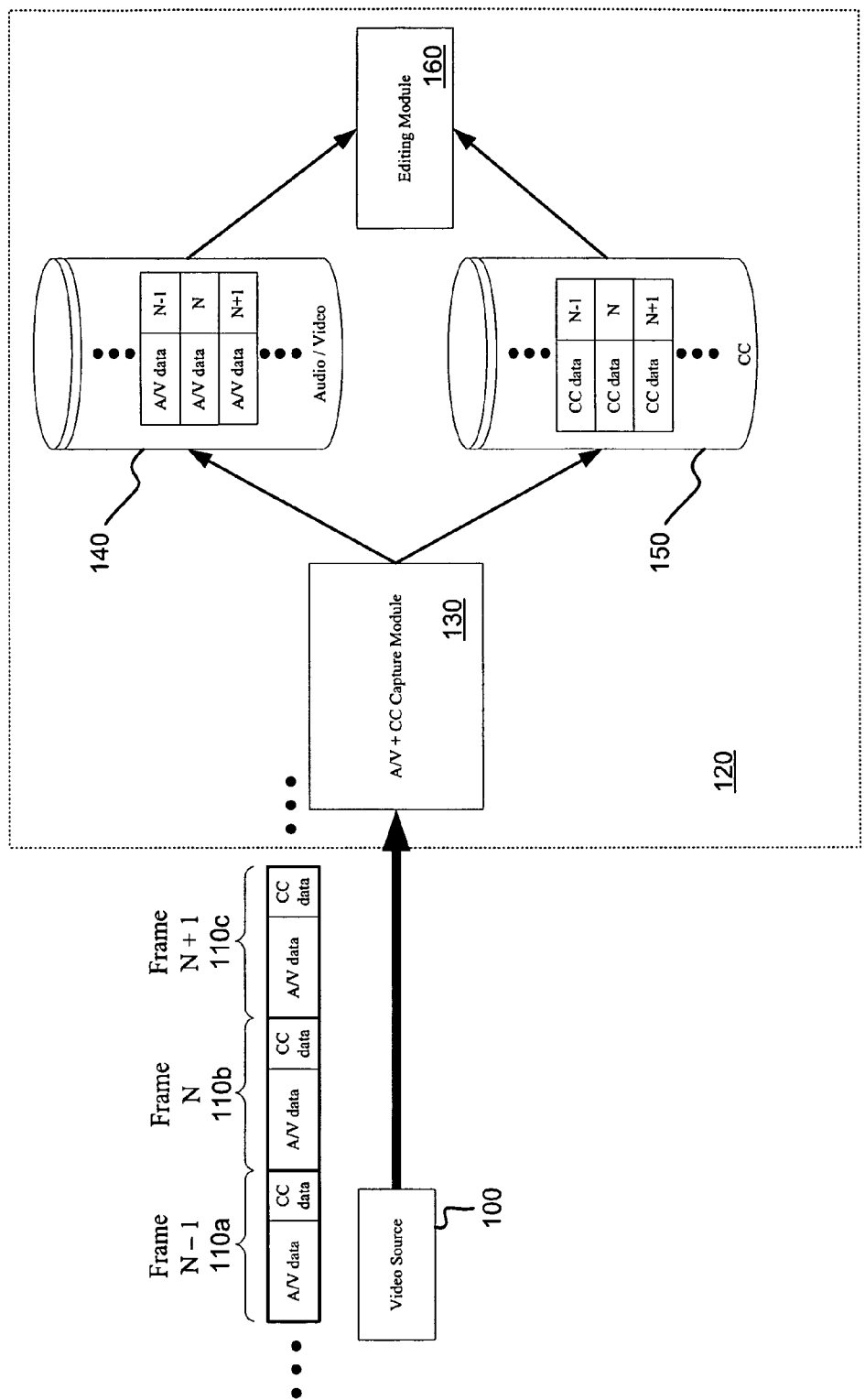
FIG. 1 conceptually illustrates a process for capturing closed captioning data from a digital video stream.

FIG. 1 conceptually illustrates an overview of a process for capturing video data and closed captioning data from a digital video stream and editing the video data and closed captioning data. As shown in FIG. 1, a digital video stream 110 is received by a computer system 120 from a video source 100. Video source 100 is a digital video camera or other such device or an input/output device such as a PCI board in some embodiments. In other embodiments, the video source 100 is a computer (e.g., a server) providing the digital video stream 110 through a network or a network of networks (e.g., the Internet).

The digital video stream 110 includes several video pictures, including video pictures 110a-110c. In some embodiments, each video picture includes audio/video data and closed captioning data. As further shown in FIG. 1, the computer system 120 includes an audio/video/closed captioning capture module 130 and an editing module 160. In some embodiments, the capture module 130 and editing module 160 are modules of a video editing application that can process HD digital video.

The capture module 130 receives the digital video stream 110 and extracts the audio/video data and closed captioning data from the digital video stream 110. The extracted audio/video data and closed captioning data are then stored. As shown in this figure, the extracted audio/video data 140 is stored separately from the extracted closed captioning data 150. However, in some embodiments of the invention, the audio/video data 140 and closed captioning data 150 are stored together in a single storage.

For example, in some embodiments, the audio/video data and closed captioning data are stored in different physical storage or different memory space. In other embodiments, the audio/video data and closed captioning data are stored in different sections of the same storage or different sections of the same memory space. In some embodiments, the audio/video data and closed captioning data are stored in separate sections of the same storage or memory space for a transient period as the video data and closed captioning data are extracted, after which they are combined in one physical location or section (e.g., in a media file, such as a QuickTime movie file).

In some such instances, all audio/video data 140 is extracted and stored in an audio/video storage before closed captioning data 150 is extracted. The closed captioning data 150 is then extracted from the digital video stream 110. In other such cases, the audio/video data 140, and then the closed captioning data 150, is extracted on a video picture by video picture basis. After the closed captioning data 150 has been extracted, the closed captioning data 150 is stored with the audio/video data 140. In some embodiments, the closed captioning data 150 is stored with the audio/video data 140 as a single movie file.

After the audio/video data 140 and closed captioning data 150 have been stored, they can be edited. In some embodiments, the editing module 160 of the computer system 120 edits the audio/video data 140 and the closed captioning data 150. In other embodiments, the editing of the closed captioning data is performed by an external application that is separate from the editing module 160 (and, in some cases, is separate from the video editing application of which editing module 160 is a part).

Figure 2:
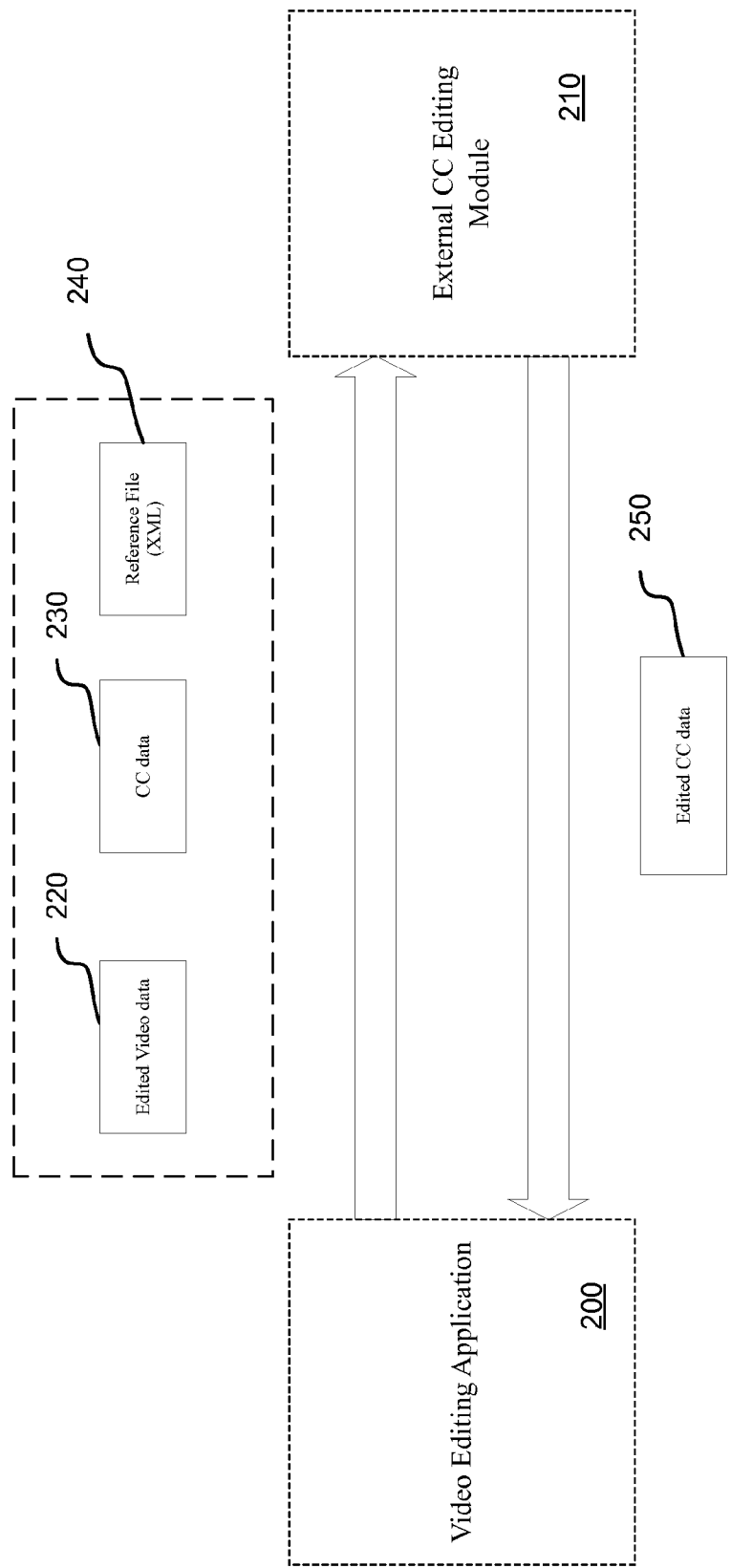
FIG. 2 conceptually illustrates an example of how two applications may be used to edit audio/video data and closed captioning data.

FIG. 2 conceptually illustrates the use of two applications for editing audio/video data and for editing closed captioning data. Specifically, this figure illustrates a video editing application 200 for editing video data and an external application 210 for editing closed captioning data. The video editing application edits the video data (e.g., audio/video data 140) and generates edited video data 220. In some embodiments, editing video data includes (i) combining the video with other video and/or audio clips, (ii) deleting parts of the imported video (e.g., removing frames from the imported video), (iii) changing the temporal position of at least one video picture (e.g., one frame) in the sequence of pictures that make up the imported video, (iv) adding special effects to the imported video, (v) changing visual attributes (e.g., luminance, chrominance) of the imported video, and (vi) generating new video. In some embodiments, the video editing application 200 also generates metadata 240 (e.g., an XML file) that specifies the changes made to the video data. This generated metadata is further described in detail in Section II.

As shown in FIG. 2, the video editing application 200 of some embodiments provides the edited video data 220, the closed captioning data 230, and metadata 240 to the external application 210. In other embodiments, the metadata 240 is provided along with a reference file that indicates where the edited video data 220 and closed captioning data 230 are located. Based on the metadata 240, the closed captioning data 230 is edited by the external application 210. The edited closed captioning data 250 is then provided by the external application 210 to the video editing application 200.

Figure 3:
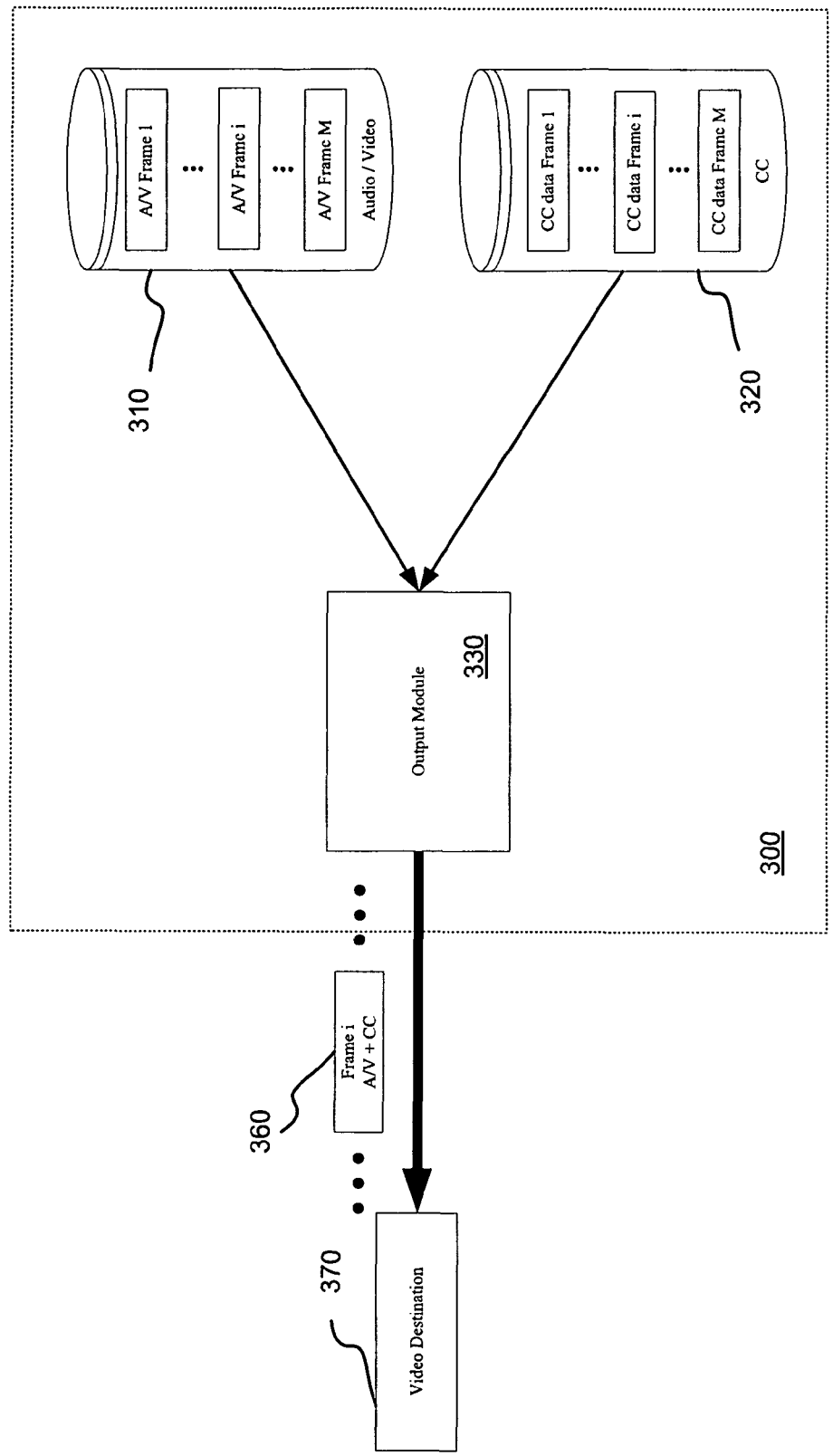
FIG. 3 conceptually illustrates how audio/video data may be combined with closed captioning data to generate an output digital video stream.

After the audio/video data 140 and/or closed captioning data 150 have been edited, they can be outputted together as a digital video stream. FIG. 3 conceptually illustrates how audio/video data may be combined with closed captioning data to generate and output a digital video stream. Specifically, FIG. 3 illustrates a computer system 300 that includes audio/video data 310 and closed captioning data 320 and an output module 330. As shown in this figure, the audio/video data 310 is stored separately from the closed captioning data 320. However, in some embodiments, the audio/video data 310 and the closed captioning data 320 are stored together in a single storage. In other embodiments, the closed captioning data 320 is stored with the audio/video data 310 as a single movie file.

As shown in FIG. 3, in some embodiments, the output module 330 receives audio/video data 310 and closed captioning data 320 and outputs a digital video stream 360 (that includes the audio/video data 310 and the closed captioning data 320) to a video destination 370. In some embodiments, the output module 330 merges the closed captioning data 320 with the video data 310. For instance, in some embodiments, the output module 330 inserts closed captioning data 320 into the appropriate digital video pictures based on a mapping relationship. As illustrated, Frame i of the video stream 360 includes the audio/video data for Frame i as well as the closed captioning data for Frame i.

Having briefly described processes for (i) extracting video data and closed captioning data from a digital video stream, (ii) editing video data and closed captioning data, and (iii) outputting edited video data and edited closed captioning data as a digital video stream, these processes will be further discussed in detail below in Sections III-V. However, before this discussion, some of the HD video stream formats will be explained below in Section II as these formats are described further to clarify the more detailed embodiments.

II. Digital Video Data Structure

As stated above, numerous data structures for digital video are described and mentioned in the present application. An overview of some of the different data structures that are used in some embodiments of the invention are described below.

i. Video Picture Data Structure

In standard definition video, closed captioning data is stored in the image portion of the video, which is specified by the Consumer Electronics Association ("CEA") 608 Standard. Under this particular standard, each video picture is allocated 2 bytes per field of a video picture for storing closed captioning data. Since there are two fields per video picture, 4 bytes can be allocated to a video picture. However, in high definition ("HD") video, the closed captioning data is stored differently than in standard definition video. The format for storing closed captioning data in HD video is specified under the CEA 708 Standard. Data structures that store closed captioning data for HD digital video according to the 708 Standard will now be described below.

Figure 4:
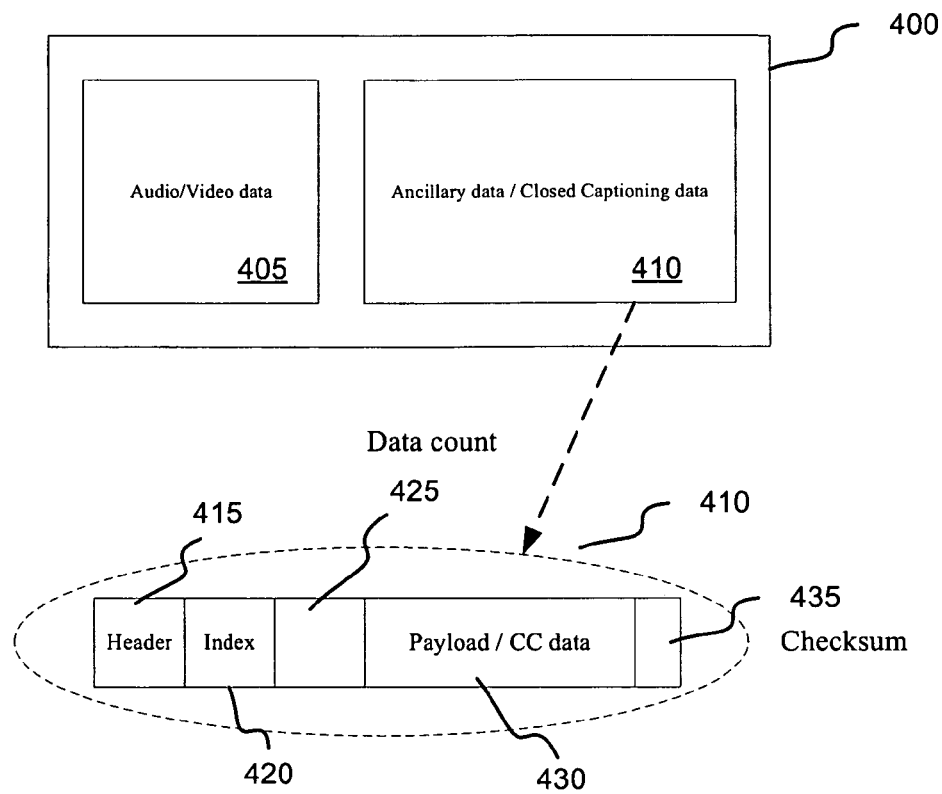
FIG. 4 illustrates a video picture that includes video data and closed captioning data in some embodiments of the invention.

FIG. 4 conceptually illustrates the contents of a high definition ("HD") digital video picture 400 and how closed captioning data is stored in some embodiments. As shown in this figure, the digital video picture 400 includes audio/video data 405 and ancillary data 410. In some embodiments, the closed captioning data is stored in the ancillary data 410.

In some embodiments, digital video picture 400 is a compressed digital video picture. However, the digital video picture 400 is an uncompressed digital video picture in some embodiments. The closed captioning data is stored separately in the digital video picture whether the digital video picture is compressed or uncompressed, though in some cases the manner in which the closed captioning data is stored in the digital video picture is different for compressed and uncompressed digital video.

As shown in FIG. 4, the ancillary data 410 of some embodiments includes a header 415, a data block index 420, a data count 425, a payload 430 and a checksum 435. The header 415 and data block index 420 store information about the ancillary data 410. The data count 425 stores the length of the payload 430. The payload 430 stores the closed captioning data for the digital video picture. While the payload 430 can store closed captioning data formatted according to the 708 Standard, the payload 430 can also store closed captioning data formatted according to the 608 Standard. Although the payload 430 may carry more than 2 bytes per field (4 bytes per video picture), only 2 bytes of information per field (4 bytes per video picture) is stored when CEA 608 format is used. The checksum 435 stores a value for checking the integrity of the data 410. Within the payload 430, some embodiments may store additional information, such as timecode data, which can be used to synchronize the closed captioning data with the video data of the video picture, as further described below in Section III.

Figure 5:
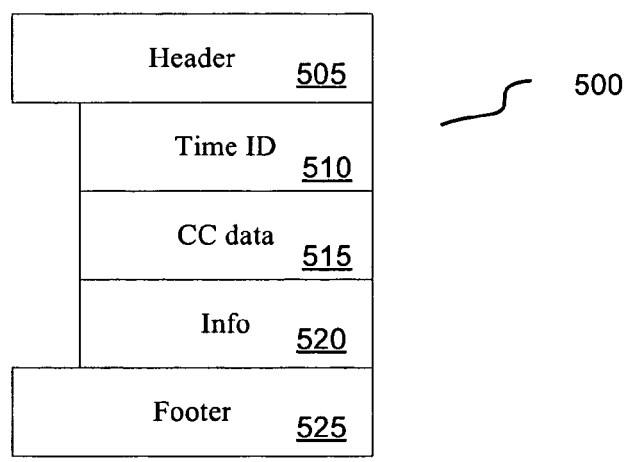
FIG. 5 illustrates a data structure for storing closed captioning data in some embodiments of the invention.

FIG. 5 conceptually illustrates another data structure for storing closed captioning data in HD digital video under the CEA 708 standard. As shown in this figure, the data structure 500 includes a header 505, a time identifier ("ID") section 510, a closed captioning data section 515, a closed captioning info section 520, and a footer 525. The header 505 identifies the data structure as a data structure for carrying closed captioning data. This allows a capture module of a video editing application of some embodiments to identify which data in a video stream is closed captioning data. In some embodiments, the header 505 also indicates the length of the data structure and identifies different sections in the data structure.

The time ID section 510 allows the data in the data structure 500 to be synchronized with the video data of the digital video stream as the digital video picture is captured, edited and outputted. In other words, the time ID section 510 identifies with which video the closed captioning data is associated/displayed with. In some embodiments, the time ID section includes information about how the video picture is incrementally positioned. For instance, in some embodiments, the time ID is a number that is incremented for each digital video picture in a digital video stream.

The closed captioning data section 515 stores the actual closed captioning data. For example, the data section 515 stores the characters (e.g., letters, numbers, symbols, etc. . . . ) of the closed captioning data that are displayed. Although the data structure 500 is defined for storing CEA 708 formatted closed captioning data, the data section 515 can store CEA 608 formatted closed captioning data.

The closed captioning info section 520 stores information about the different closed captioning services that are active for the data structure 500. These services are described in the Advanced Television Systems Committee ("ATSC") HDTV Standard. For instance, closed captioning services can provide font formatting information, among various other services.

The footer 525 stores a sequence counter data and a checksum of the entire data structure 500. In some embodiments, the footer 525 is used to verify the integrity of the data structure 500.

FIGS. 4 and 5 illustrate data structures that are used for an HD digital video stream that is received and/or outputted by a video editing application according to some embodiments of the invention. Some embodiments store closed captioning data after extraction and/or before outputting using a different data structure. For instance, after extraction from the HD digital video stream, the audio/video data and closed captioning are stored as a movie file (e.g., in QuickTime movie format) in some embodiments.

Figure 6:
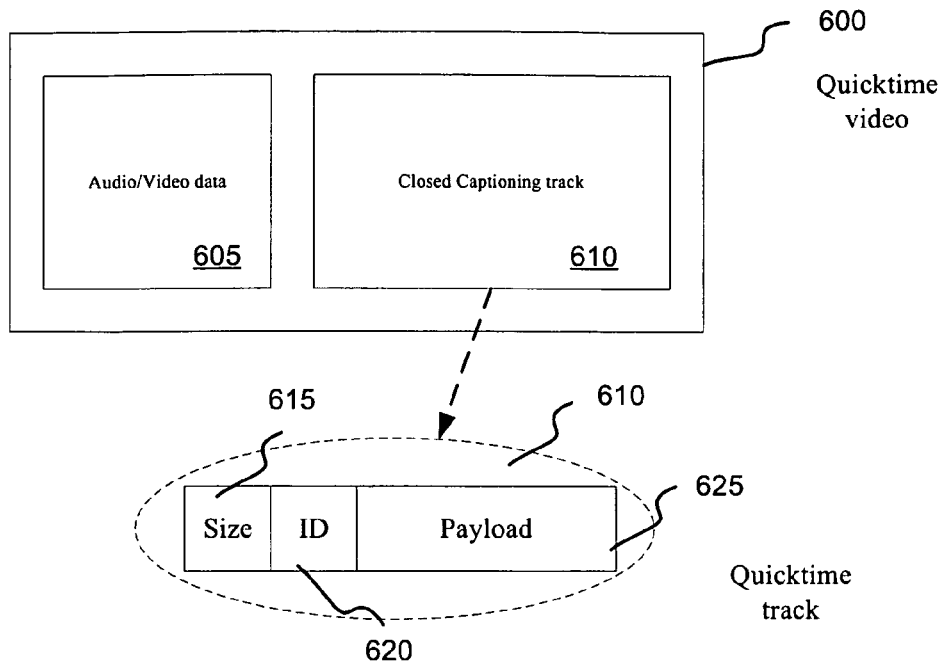
FIG. 6 illustrates how closed captioning data is stored in a video picture under QuickTime format in some embodiments of the invention.

FIG. 6 conceptually illustrates how closed captioning is stored using the QuickTime format. As shown in this figure, the QuickTime digital video picture 600 includes video data 605 and closed captioning data 610. FIG. 6 also illustrates in further detail the data stored in a closed captioning data 610. As shown, closed captioning data 610 includes a size section 615, an ID section 620 and a payload/caption 625. The size section 615 stores information about the length of the data 610. The ID section 620 identifies the type of data 610 (e.g., 608 formatted, 708 formatted, etc.) that is stored. In some embodiments, the ID section 620 is used by a capture module to identify closed captioning data (e.g., if a QuickTime movie is being downloaded through the Internet). The payload 625 stores the actual closed captioning data.

Figure 7:
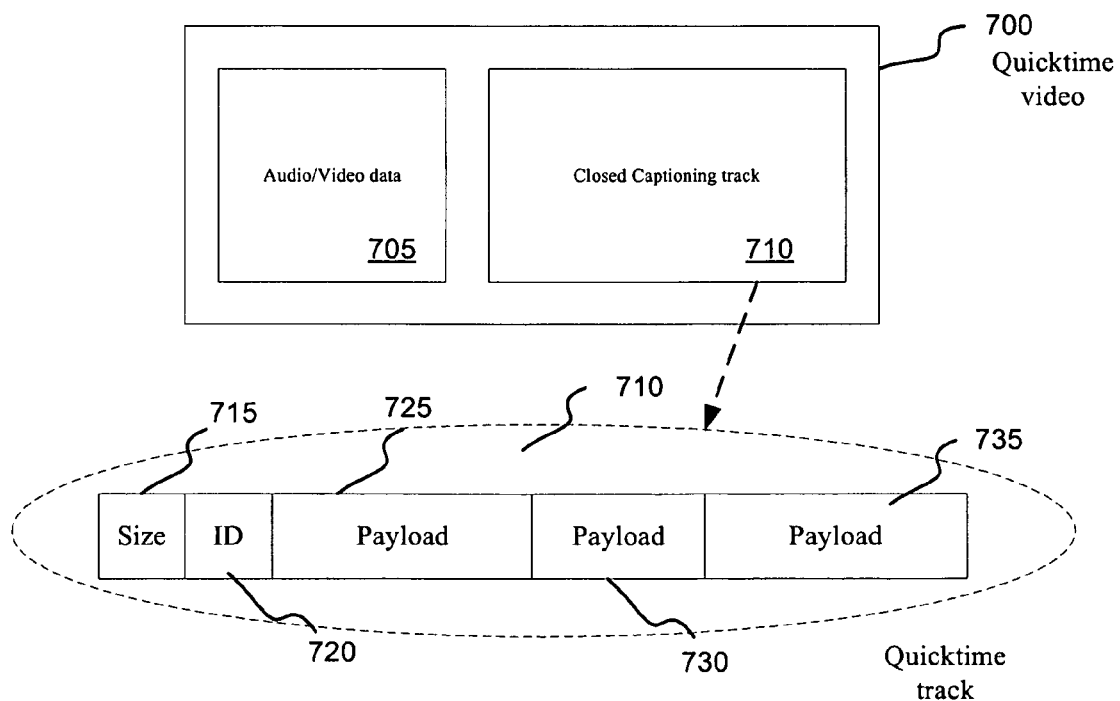
FIG. 7 illustrates how several closed captioning data are stored in a single video picture under QuickTime format in some embodiments of the invention.

In some embodiments, a video picture can include more than one payload/caption data. FIG. 7 conceptually illustrates a video picture stored under QuickTime format that includes more than one caption data. As shown in this figure, the video picture 700 includes video data 705 and closed captioning data 710. The closed captioning data 710 includes a size section 715, an ID section 720, a first payload/caption 725, a second payload/caption 730, and a third payload/caption 735. In some embodiments, each payload in a particular video picture may be all the same size or at least one of the payloads may have a different size from the rest. FIG. 7 illustrates that the size of payload 730 is different than that of the payloads 725 and 735.

Figure 8:
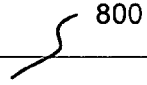
FIG. 8 illustrates how closed captioning data is stored in a text format, such as the Scenarist format in some embodiments of the invention.

As previously mentioned, closed captioning data is stored separately (e.g., as a separate file) from the audio/video data after being captured or before being outputted in some embodiments. In some such instances, closed captioning data is stored as text, in a text file format, such as Scenarist Closed Captioning ("SCC") format. FIG. 8 illustrates an example of closed captioning data stored as text under a Scenarist format. As shown in this figure, the first line of the text file indicates the format and version of the format ("Scenarist_SCC V1.0"). The second line of the text file is blank. The third line and all subsequent alternating lines indicate the timecode and the hexadecimal data associated with the time code. The format of the timecode is specified by the Society of Motion Picture and Television Engineers ("SMPTE") standard, which specifies the following format: hours:minutes:seconds:frames. Thus, the third line of the text file indicates that the data is to be displayed at the fourteenth video picture that is 2 hours, 5 minutes, 25 seconds into the video data. The hexadecimal data includes information such as what the actual closed captioning should say and where it should be superimposed over the video. The hexadecimal data can also include parity and error control codes, which are used to check the integrity of the closed captioning data in some embodiments. In addition to the above described data structures for storing audio/video data and closed captioning data, some embodiments of the invention also utilize other structures to capture, edit and output digital video streams. For example, some embodiments use an XML data structure for coordinating video data with closed captioning data, which is further described below.

ii. XML Data Structure

As mentioned above, the editing of the audio/video data and the closed captioning data are performed by separate applications in some embodiments. Thus, one application may require information about the type of changes that were made by the other application. For example, it may be useful for a video editing application that edits audio/video data to provide information about how the audio/video data was edited to an application that edits and/or generates closed captioning data. In some embodiments of the invention, such information is provided in the form of a metadata of the edited audio/video content. In some embodiments, the information is provided as an XML file.

FIG. 9 illustrates a portion of XML code 900 of some embodiments that indicates how audio/video data and closed captioning data are related to each other. The XML code 900 is of the type that a video editing application of some embodiments would provide to an external application for generating closed captioning data to be merged with the audio/video data upon output. As shown in FIG. 9, the XML includes a sequence of the audio/video data. The sequence of audio/video data specifies how the audio/video data has been edited. As shown in this figure the sequence includes three video data (Clip1, Clip2 and Clip3).

As shown in FIG. 9, the top of the file includes tags (i.e., keys) that identify the XML.

```
<?xml version="1.0" encoding="UTF-8"?>
<!DOCTYPE xmeml>
<xmeml version="5">
```

The XML code 900 includes a <sequence> key, which identifies the sequence (e.g., timeline). In some embodiments, the sequence specifies how the various video data are organized/arranged. The sequence specifies the temporal positions of the different video data in some embodiments. In some embodiments, a sequence includes portions of video from multiple different video files and the XML specifies how these are arranged. The title of the sequence can be specified by a sequence ID key as shown below.

```
<sequence id="Sequence 1 ">
<name>Sequence 1</name>
```

The duration of the sequence (e.g., duration of clips) can be specified by a duration key, as illustrated below. In this particular example, the sequence has a duration of 73 video pictures, as indicated by the code "<duration>73</duration>". However, other units of time or position can be used to specify the duration in some embodiments. For instance, the duration is provided in a format of hours:minutes:seconds in some embodiments.

Some embodiments also specify the frame rate of the particular sequence. The frame rate illustrated in XML 900 is 30 fps and is in the NTSC timing (which means that the frame rate is actually 29.97 fps). The rate and timing of the sequence can be specified by a rate key and a timing key, as shown below.

```
<rate>
<ntsc>TRUE</ntsc>
<timebase>30</timebase>
</rate>
```

In some embodiments, the sequence has a starting time (e.g., at 1 hour), which can be specified by a timecode key, as shown below.

```
<timecode>
<string>01:00:00;00</string>
</timecode>
```

A sequence can include various types of media (video data, audio data, effects, etc.) in some embodiments. As mentioned above, the sequence described by XML 900 includes 3 video data (e.g., 3 video clips). The sequence also includes a transition item. In some embodiments, a transition item is an effect that is used/applied between two clips. The media (e.g., clips, transition item) are arranged in a particular order in the sequence, which is specified by the order of the item keys as shown below.

```
<clipitem id="Clip1">
<transitionitem>
```

```
        <clipitem id="Clip2">
        <clipitem id="Clip3">
```

As shown above, in this particular sequence, Clip1 is first displayed followed by the transition item, Clip2 and Clip3. Each clip item has a name key (<name>), a duration key (<duration>), a rate key (<rate>) and in/out keys (<in>, <out>) for specifying the portion of the video clip that is inserted into the sequence.

```
        <in>0</in>
        <out>44</out>
```

Although the clip has a duration of 64 video pictures, only video pictures 0-44 (total of 45 video pictures) of the clip are inserted in the sequence.

Each clip also includes information about the name and location of the file that stores the clip. As shown below, the reference of location to the file is specified by a pathurl key.

```
        <file id="Clip1">
        <name>Clip1.mov</name>
        <pathurl>file://localhost/Volumes/DiskNum1/FCPDocs/
            CaptureScratch/Project1/Clip1.
            mov</pathurl>
```

Some embodiments also specify the location of the file that includes closed captioning information for the video clip, when such a file is separate from the file storing the video clip. The media in the XML can include other data, such as width and height of video data (e.g., clip), as illustrated below.

```
        <media>
        <video>
        <duration>64</duration>
        <samplecharacteristics>
        <width>720</width>
        <height>486</height>
        </samplecharacteristics>
        </video>
        </media>
```

Transition items in the XML have similar keys as the clip items of the XML. For example, a transition item includes frame rate information. In addition, a transition item includes other types of data, such as start and end points and effect identification. The start and end points of some embodiments indicate where in the overall sequence the transition effect is to be applied (e.g., to which digital video pictures the effect is applied). These other types of data are identified through the start, end, and effect keys, as shown below.

```
        <start>36</start>
        <end>44</end>
        <alignment>center</alignment>
        <effect>
        <effectid>Cross Dissolve</effectid>
        <effectcategory>Dissolve</effectcategory>
        <effecttype>transition</effecttype>
```

```
        <mediatype>video</mediatype>
        </effect>
```

Applying the above description of the XML of some embodiments, we see that the XML 900 of FIG. 9 describes a sequence that includes video pictures 0 to 44 of the original Clip 1, a "cross dissolve" transition (effect) defined for video pictures 36 to 44 (of the new sequence), video pictures 13 to 24 of the original Clip 2, and video pictures 14 to 40 of the original Clip 3. Specifically, the video pictures 0 to 44 of Clip 1 are the in and out points of the original video Clip 1 that is to be inserted in the sequence. Accordingly, the video pictures 13 to 24 of Clip 2 are the in and out points of the original video Clip 2 that is to be inserted in the sequence. Because the cross dissolve effect is applied to video pictures 36-44 of Clip 1, a portion of Clip 2 (e.g., video pictures 13-21 of Clip 2) will be used with video pictures 36-44 of the sequence and the remainder of Clip 2 (e.g., video pictures 22-24) will be new video pictures 45-47 in the sequence. Similarly, the video pictures 14 to 40 are the in and out points of the original video Clip 3 that is to be inserted in the sequence and will be new video pictures 48-74 in the sequence.

Although the above sequence was shown for a sequence that only included video, a sequence can include other types of media, such as audio, in some embodiments. Moreover, while only one transition item (effect) was defined in the sequence described by XML code 900, some embodiments of the invention use more than one transition item.

One of ordinary skill in the art will recognize that because XML is a very flexible markup language, some embodiments will use keys and tags that are different from those shown in XML portion 900 in order to specify the information about a sequence. Having described the various data structures utilized by some embodiments of the invention, a detailed description of several embodiments will now be described below.

III. Digital Video Capture Software Architecture

Figure 10:
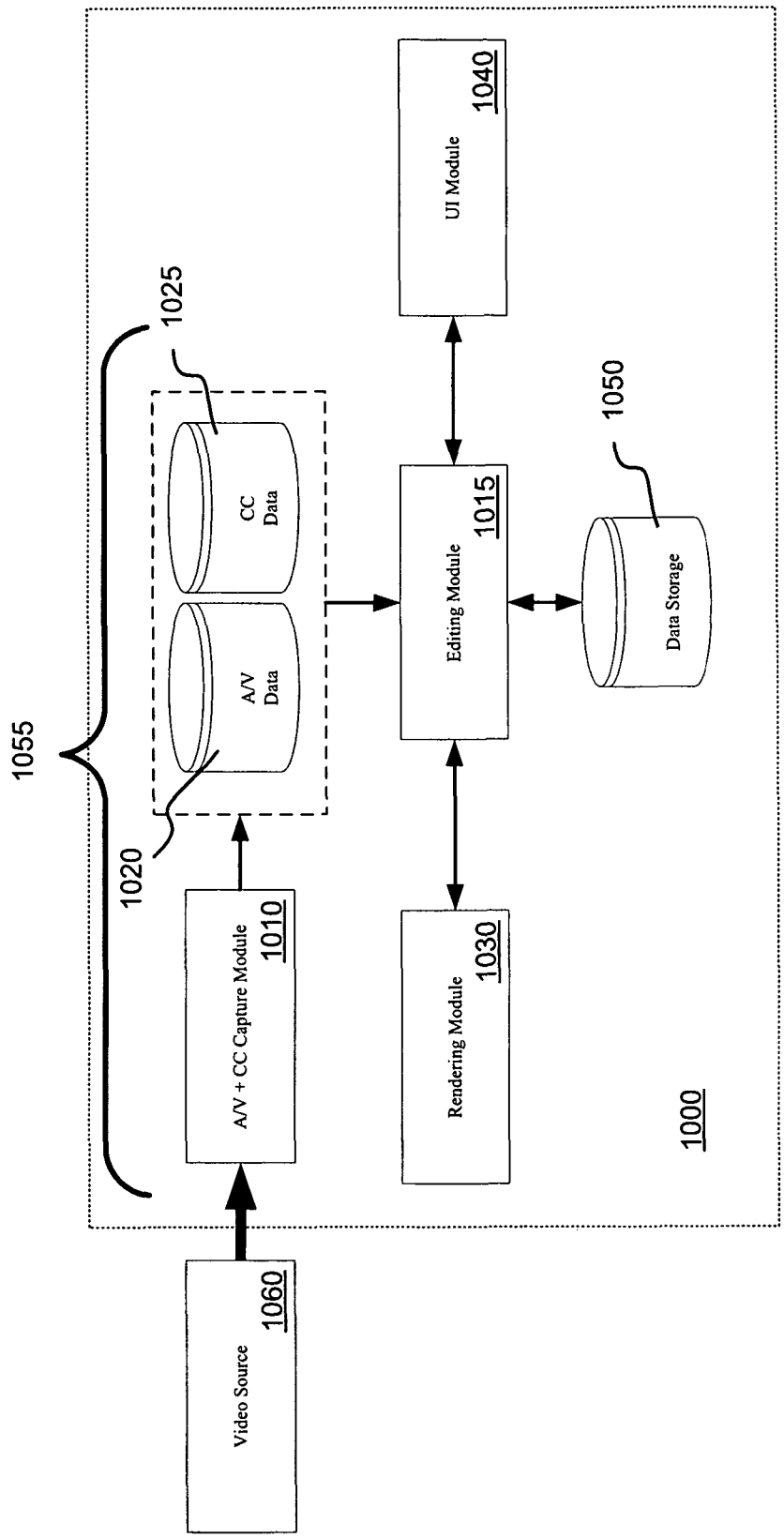
FIG. 10 illustrates the software architecture of a computer system 1000 used to capture digital video according to some embodiments of the invention.

As mentioned above, some embodiments provide a method for capturing closed captioning data from a digital video stream (e.g., an HD video stream). FIG. 10 illustrates the software architecture of a media-editing application 1000 used to capture digital video according to some embodiments of the invention. In some embodiments, the media-editing application is a stand-alone application or is integrated into another application, while in other embodiments the application might be implemented within an operating system. The media-editing application 1000 includes an audio/video/closed captioning capture module 1010, a video editing module 1015, rendering module 1030, UI module 1040 and data storage 1050.

As shown in FIG. 10, the capture module 1010 receives a digital video stream from a digital video source 1060 (e.g., a camera or tape deck, a PCI board, a web server, etc.). In some embodiments, this capture module 1010 extracts audio/video data 1020 and closed captioning data 1025 from the video stream and stores them in storage. A video stream can be a compressed video stream (e.g., a video stream downloaded through a network) or an uncompressed video stream. When the video stream is a compressed video stream, the capture module 1010 of some embodiments extracts closed captioning data in the digital video stream by looking for the header/ID information in data structures that identifies that particular data structure as storing closed captioning data. However, when the video stream is an uncompressed video stream, the closed captioning capture module 1010 requests the video source 1060 to provide any closed captioning data in some embodiments. In other embodiments, the capture module 1010 requests closed captioning data from another hardware device (e.g., camera, tape deck, PCI board etc.).

In some embodiments, as shown in FIG. 10, the audio/video data 1020 and the closed captioning data 1025 are stored in separate data storages. In other embodiments, the audio/video data 1020 and the closed captioning data 1025 are stored in the same data storage. Alternatively, some embodiments first extract all audio/video data 1020 and store audio/video data 1020 as a file before extracting closed captioning data 1025. The closed captioning data 1025 is then stored with the audio/video data 1020 in the file (e.g., QuickTime movie file). A more specific implementation of some embodiments of the extraction and storage operations is further described below with reference to FIG. 11.

Figure 11:
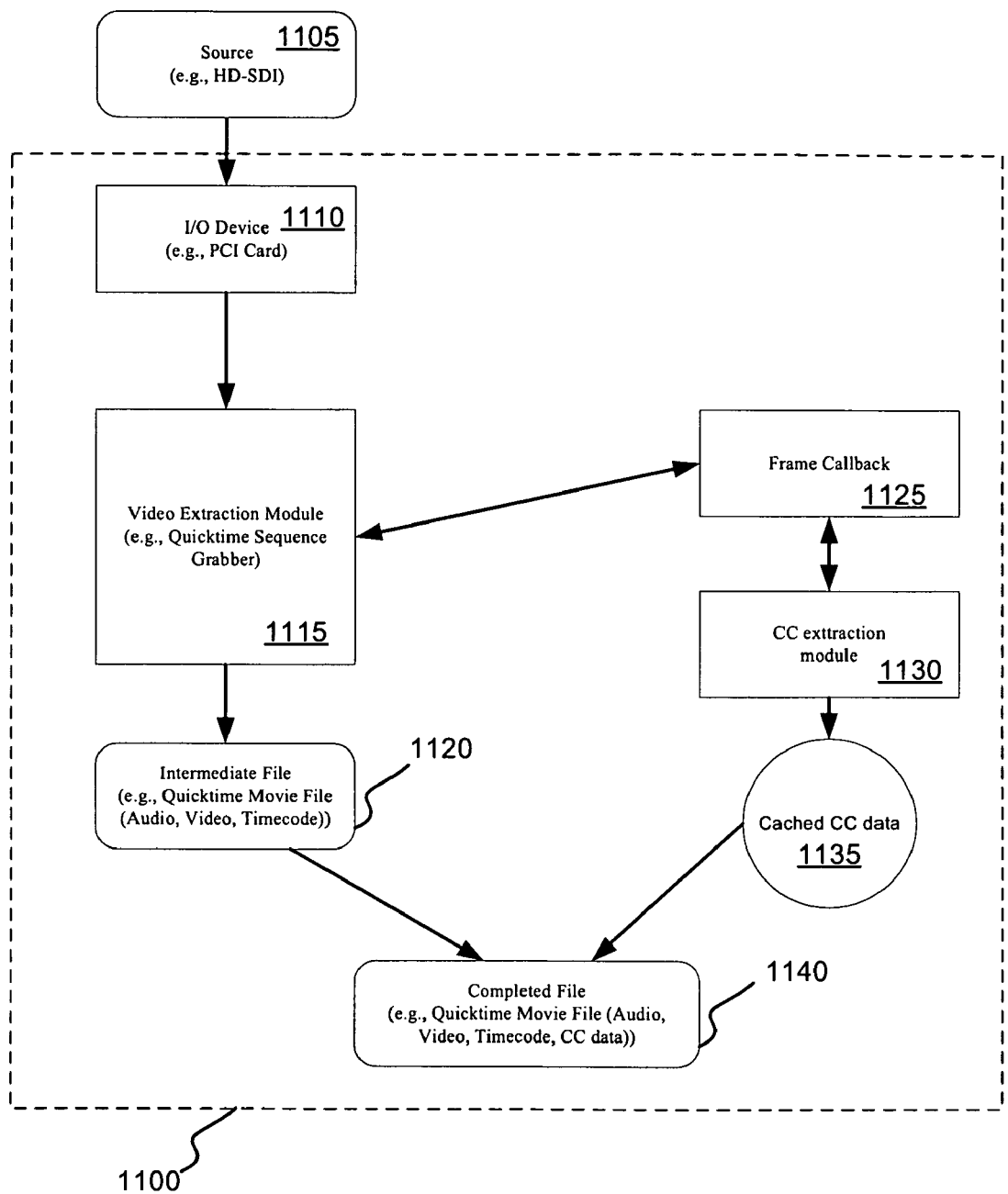
FIG. 11 illustrates how closed captioning data is captured in some embodiments.

FIG. 11 conceptually illustrates an example of how some embodiments extract video data and closed captioning data from a digital video stream. FIG. 11 illustrates a system 1100 of some embodiments. In some embodiments, the system 1100 is a detailed implementation of the components 1055 of FIG. 10. As shown in this figure, a digital video stream source 1105 (e.g., HD-Serial Digital Interface (HD-SDI) video) is received by an input/output device 1110. The digital video stream source 1105 is then passed by the I/O device 1110 to a video extraction module 1115 (e.g., QuickTime Sequence Grabber). The video extraction module 1115 extracts audio/video data from the source 1105 and stores the extracted audio/video data as an intermediate file 1120. In some embodiments, the intermediate file 1120 is a QuickTime movie file.

Once the extracted audio/video data has been stored, a callback module 1125 (e.g., Frame callback) communicates with the video extraction module 1115. In some embodiments, the callback module 1125 requests some or all of the data of the digital video stream source 1105. The video extraction module 1115 provides the requested data to the callback module 1125. The requested data is provided to the closed captioning extraction module 1130. The extraction module 1130 extracts the closed captioning data and stores the extracted closed captioning data 1135 in a cache. In some embodiments, the callback module 1125 requests each digital video picture from the source stream 1105 as the digital video picture is extracted and stored. In some embodiments, other modules also extract information from the digital video picture when it is provided to the callback module.

Once the closed captioning data has been extracted and stored, some embodiments store the cached closed captioning data 1135 with the intermediate file 1120. The combined audio/video data and cached closed captioning data are stored as a complete file 1140 in some embodiments (e.g., a QuickTime movie file). As shown in FIG. 11, a complete file 1140 of some embodiments includes audio/video data, closed captioning data and timecode data.

As mentioned above, in addition to storing audio/video data and closed captioning data, some embodiments store additional information (e.g., metadata) with each stored audio/video data and stored closed captioning data. For example, some embodiments store data that identifies how audio/video data and closed captioning data are related to or associated with one another. As shown in FIG. 1, this can be achieved by storing metadata (e.g., timecode data) with each audio/video data and closed captioning data. In some embodiments, the timecode data is part of the digital video stream (e.g., stored in closed captioning data structure) that is received by a capture module (e.g., module 130). In such cases, the timecode data is extracted from the digital video stream. In other embodiments, the timecode data can be generated by a capture module (e.g., module 130), as the audio/video data and/or closed captioning data are extracted from the digital video stream.

In some embodiments, the timecode data represents a time value. In other embodiments, the timecode data does not represent a time value and represents a position of the video picture in a sequence of video pictures. The timecode can be a number, letter or any other variable that represents the time or position value in some embodiments.

Once the audio/video data, closed captioning data, and/or timecode data are stored, some embodiments edit the audio/video data 1020 and closed captioning data 1025. The editing module 1015 of some embodiments edits the audio/video data 1020. In some embodiments, editing video data includes (i) combining the video with other video and/or audio clips, (ii) deleting parts of the imported video (e.g., removing frames from the imported video), (iii) changing the temporal position of at least one video picture (e.g., one frame) in the sequence of pictures that make up the imported video, (iv) adding special effects to the imported video, (v) changing visual attributes (e.g., luminance, chrominance) of the imported video, or (vi) generating new video.

The editing of the audio/video data can be specified by the UI module 1040. The UI module 1040 receives inputs from a user through a graphical user interface and provides the inputs to the editing module 1015 (e.g., by receiving keyboard input, cursor controller input, etc. from device drivers). The audio/video data can be rendered by the rendering module 1030, which converts the audio/video data for display in some embodiments. After the audio/video data has been edited, some embodiments of the invention store the edited audio/video data in data storage 1050. In some embodiments, data 1020 and 1025 is also stored in storage 1050. Having described a system for capturing closed captioning data, a process for capturing closed captioning data will now be described below with reference to FIG. 12.

Figure 12:
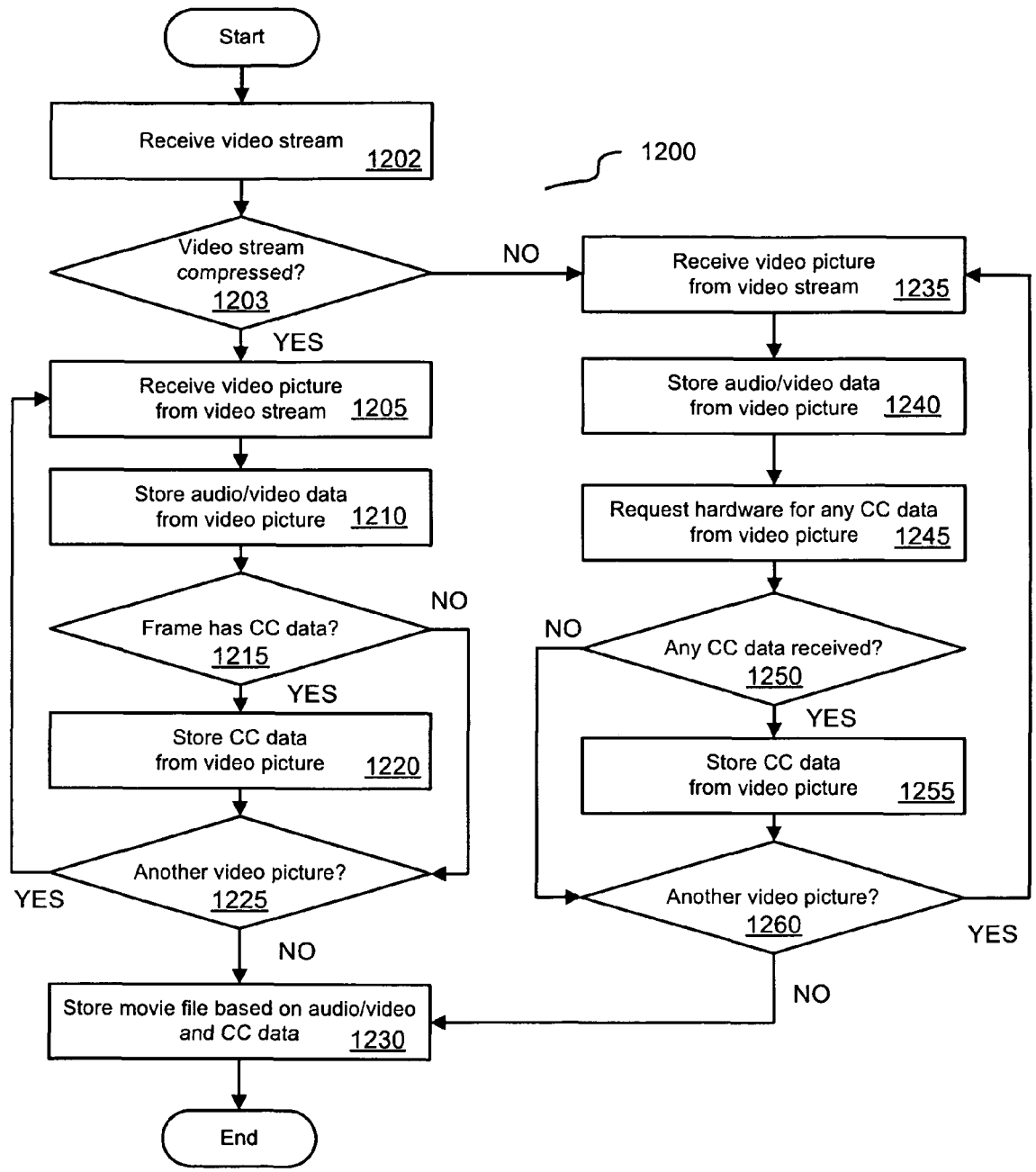
FIG. 12 illustrates a process 1200 that captures a digital video stream in some embodiments.

FIG. 12 illustrates a process 1200 of some embodiments that captures a digital video stream. In some embodiments, the process 1200 is performed by the media-editing application 1000. Specifically, the capture module 1010 performs the process 1200 in some embodiments.

As shown in FIG. 12, the process 1200 initially receives (at 1202) a video stream. In some cases, the video stream is received from an external device such as a camera, tape deck, etc. In some cases, the source is received from an input/output device such as a PCI board, etc. (though the PCI board may have received the source from an external device). In other situations, the source is received through a network, such as from a web server over the Internet.

The process then determines (at 1203) whether the video stream is compressed (i.e., whether the video stream is a compressed or uncompressed video stream). For instance, video streaming over the Internet is likely to be a compressed digital video stream (e.g., an H.263 or H.264 encoded stream). On the other hand, video received directly from a camera may be uncompressed data.

When the video stream is compressed, the process receives (at 1205) a video picture from the video stream. Otherwise, the process proceeds to 1235, described below. In some embodiments the digital video pictures of the digital video stream have the data structure 400 or 500.

The process then stores (at 1210) the audio/video data for the video picture. In some embodiments, the audio/video data is temporarily stored in cached memory, while in other cases the audio/video data is stored in a permanent file (e.g., a QuickTime file). The process then determines (at 1215)

whether there is closed captioning data stored with the video picture. In some embodiments, this determination is made by examining the header information of the video picture to see whether the header indicates that the video picture includes closed captioning information.

If the video picture includes closed captioning information, the process stores (at 1220) the closed captioning data. Some embodiments store the closed captioning data in a text file such as text file 800, or in a cache. Process 1200 then determines (at 1225) whether there is another video picture. If so, the process proceeds to 1205 and receives another video picture. Once the process determines (at 1225) that there are no more video pictures, the process stores (at 1230) all of the audio/video data and closed captioning data in a movie file (e.g., a QuickTime file).

At 1203, when the process determines the video stream is not compressed (i.e., that the video stream is an uncompressed video stream), the process receives (at 1235) a video picture from the video stream. In some embodiments, the digital video pictures of the uncompressed digital video stream have the data structure 400 or 500.

Process 1200 then stores (at 1240) the audio/video data for the video picture. In some embodiments, the audio/video data are temporarily stored in cached memory, while in other cases the audio/video data is stored in a permanent file (e.g., a QuickTime file). The process then requests (at 1245) the hardware (e.g., PCI card, camera, etc.) for any closed captioning data for the video picture. In some embodiments, the hardware includes a processing module that receives and processes a video stream (e.g., HD-SDI video stream). In such instances, the request (at 1245) is made to the processing module of the hardware. After requesting (at 1245) any closed captioning data, the process determines (at 1250) whether any closed captioning data is received for the video picture (i.e., any closed captioning data provided by the hardware or processing module for the video picture).

When closed captioning data is received, the process (at 1255) stores the closed captioning data for the video picture. The process then determines (at 1260) whether there is another video picture. If there is another video picture, the process proceeds to 1235 and receives another video picture. However, when the process determines (at 1260) that there are no more video pictures, the process stores (at 1230) all of the audio/video data and closed captioning data in a movie file. In some embodiments, the movie file is a QuickTime movie file. In such embodiments, the closed captioning data is stored in a track of the movie file (e.g., data structure 700). Alternatively, the audio/video data and the closed captioning data can be stored separately. For example, the closed captioning data can be stored in a separate text file. Different embodiments may use different formats and data structures to store the closed captioning data, as was previously described in Section II.

Figure 13:
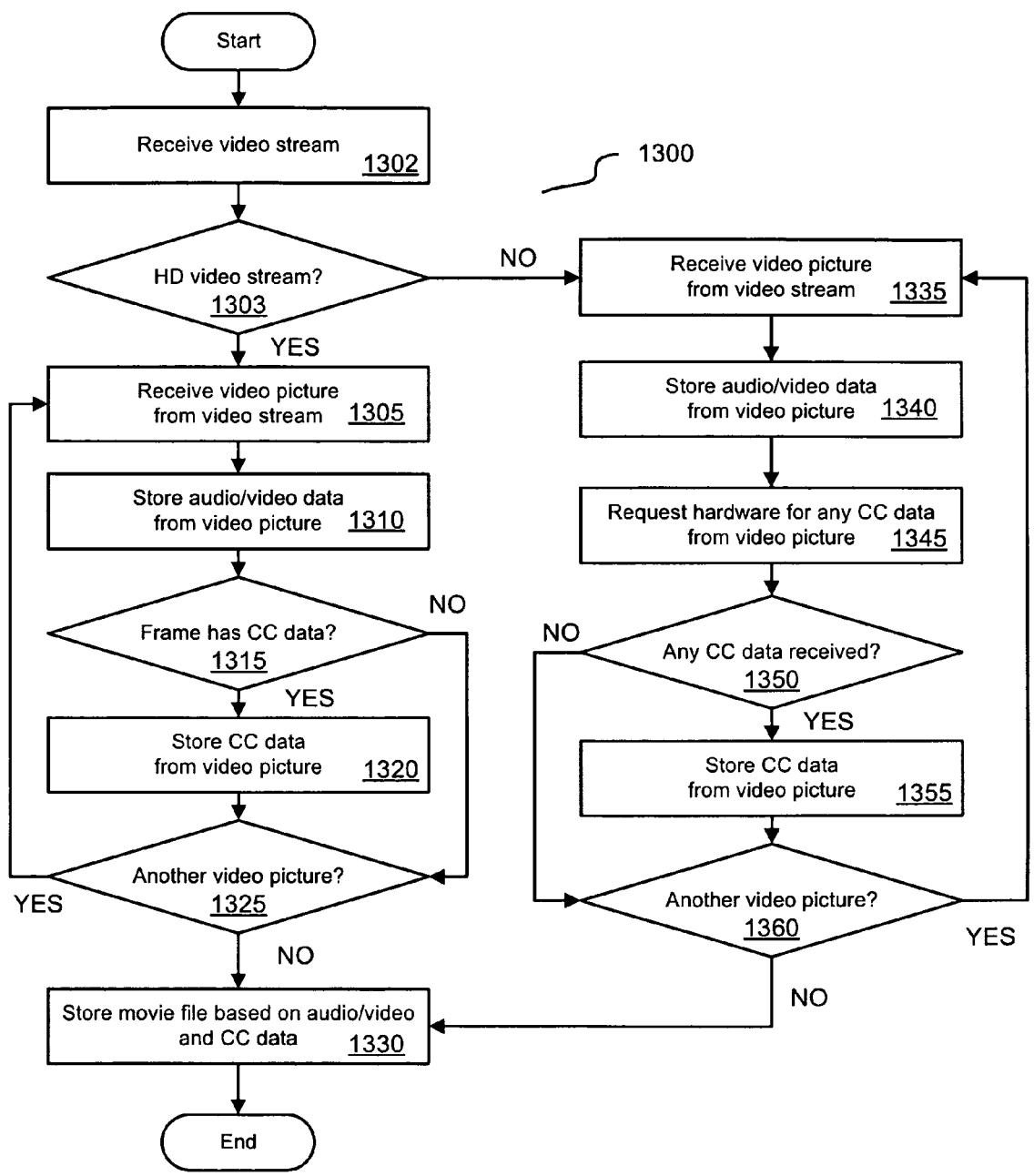
FIG. 13 illustrates a process 1300 that captures an HD or standard definition digital video stream in some embodiments.

The above process is used for processing HD digital video streams. Some embodiments can process both standard definition and HD digital video streams. FIG. 13 illustrates a process 1300 of some embodiments that can process both compressed HD and standard definition video streams. FIG. 13 is similar to FIG. 12, except that process 1300 determines (at 1303) whether the video stream is an HD video stream (i.e., whether HD or standard definition video stream). One of ordinary skill would recognize that a similar process could also be used to process uncompressed HD or standard definition video streams.

Having described processes that capture a digital video stream, extract audio/video data and closed captioning data, and edit audio/video data, processes for outputting a digital video stream based on edited audio/video data and/or closed captioning data will now be further described below.

IV. Digital Video Output Software Architecture

Figure 14:
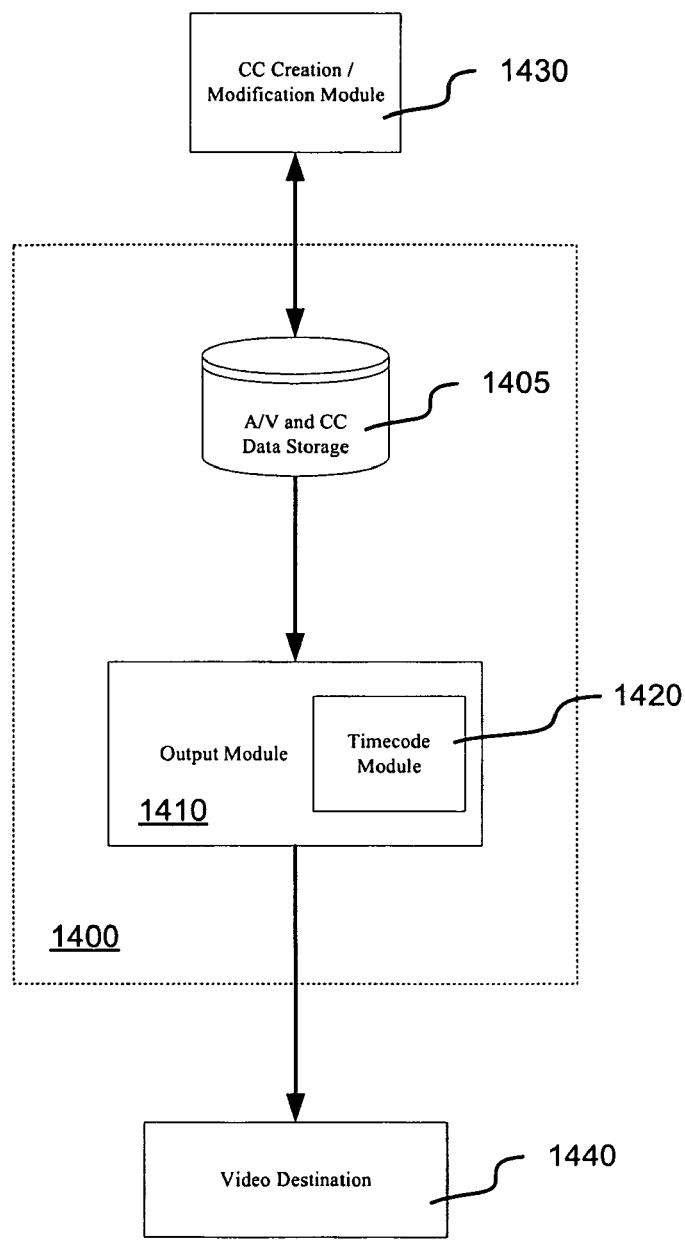
FIG. 14 illustrates the software architecture of a computer system 1400 used to output a digital video according to some embodiments of the invention.

As mentioned above, some embodiments provide a method for outputting a digital video stream (e.g., an HD digital video stream) from a computer. FIG. 14 illustrates the software architecture of a media editing application 1400 used to output a digital video stream according to some embodiments of the invention. The media editing application 1400 includes data storage 1405 and output module 1410. The output module 1410 includes a timecode module 1420. However, in some embodiments, the timecode module 1420 is separate from the output module 1410. As shown in FIG. 14, the data storage 1405 stores one or more digital video clips (e.g., video data) that might have been edited by other modules of media-editing application 1400 (i.e., by modules not shown in FIG. 14). Each digital video clip might be formed by one or more video clips. Each video clip can have one or more audio tracks (e.g., audio data). Also, each video clip could have been produced by adding video effects to its clip(s) and/or audio effects to its audio track(s) in some embodiments.

The data storage 1405 also stores closed captioning data that is associated with each video clip/video pictures. In some embodiments, the closed captioning data is data that is captured when a digital video stream is received by the computer. In other embodiments, the closed captioning data is edited closed captioning data from a closed captioning creation/modification module 1430. The creation/modification module 1430 can be part of a media editing application 1400 or it can be separate from the media editing application 1400.

The output module 1410 retrieves the audio/video data and closed captioning data from the data storage 1405. In some embodiments, the output module 1410 works with the timecode module 1420 to merge the audio/video data and closed captioning data (e.g., by inserting the closed captioning data into the appropriate digital video pictures). The output module 1410 outputs a video stream to a digital video destination 1440 (e.g., a tape deck, an internal input/output device, a device connected through a network, etc.). The digital video stream includes the audio/video data and closed captioning data.

Having described an implementation of some embodiments for outputting a digital video stream, a specific example of outputting a digital video stream according to some embodiments will now be discussed with reference to FIG. 15.

Figure 15:
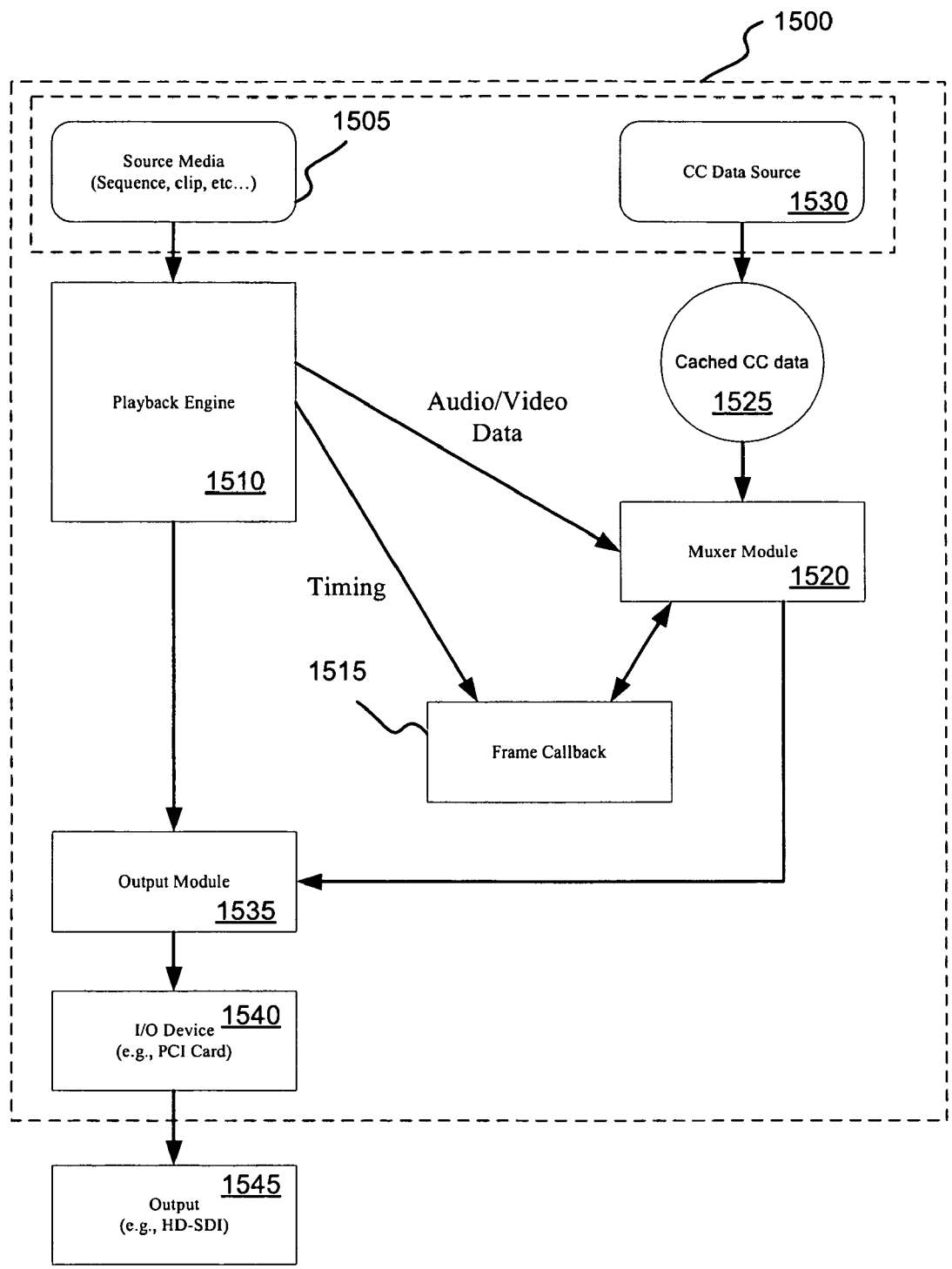
FIG. 15 illustrates how digital video is outputted with closed captioning data in some embodiments.

FIG. 15 conceptually illustrates how some embodiments of the invention output a digital video stream based on edited closed captioning data. FIG. 15 illustrates a system 1500 for outputting a digital video stream. In some embodiments, the system 1500 is a detailed implementation of the components 1400 of FIG. 14. As shown in this figure, a playback engine 1510 receives a source media 1505 (e.g., video data from a QuickTime file). In some embodiments, the source media 1505 is a video clip including several video pictures. The playback engine 1510 communicates with the callback module 1515 (e.g., frame callback) and muxer module 1520. Specifically, the playback engine 1510 provides audio/video data to the muxer module 1520 and timing data (e.g., timecode) to the callback module 1515. In some embodiments, the timing data is a timecode that specifies when closed captioning data is to be displayed, or into which video pictures closed captioning data should be inserted. The muxer module 1520 communicates with the callback module 1515 to get the timing data. In some embodiments, the timing data is provided directly from the playback engine 1510 to the muxer module

1520. In addition, the muxer module 1520 retrieves closed captioning data from the cached closed captioning data 1525.

The cached closed captioning data 1525 is based on a closed captioning source 1530. In some embodiments, the closed captioning source 1530 is a movie file that includes audio video data (e.g., a QuickTime movie). The closed captioning source 1530 is the same as the source media 1505 in some embodiments (e.g., when the video data and closed captioning data are stored together in a movie file). In other embodiments, the closed captioning source is a text file that includes closed captioning data (e.g., a Scenarist file such as file 800 of FIG. 8).

To ensure that closed captioning data is inserted into the proper video pictures of an HD digital video stream (e.g., video output 1545), a mapping relationship between the closed captioning data 1525 and the video data in the source media 1505 is defined by some embodiments when closed captioning data is loaded from the source 1530 to cached memory. The mapping relationship of some embodiments defines, for each particular piece of closed captioning data, a particular video picture into which the particular closed captioning data will be inserted when an HD digital video stream is outputted. In some embodiments, this mapping relationship is stored as a memory array. The use of a mapping relationship (e.g., mapping array) will be further described below with reference to FIGS. 18*a*-18*b*.

After inserting the closed captioning data into the video picture, the muxer module 1520 provides the audio/video data and closed captioning data to the output module 1535. When there is no closed captioning data, the audio/video data is provided from the playback engine 1510 to the output module 1535. The output module 1535 then outputs a digital video stream that includes the video pictures and any closed captioning data inserted into the video pictures. In some embodiments, the output module 1535 converts the format of the video picture from a QuickTime movie to another digital video format (e.g., HD-SDI). The digital video stream is then sent to the input/output device 1540, which provides the stream as an output 1545 to an external device (e.g., TV, DVD, etc.).

Figure 16:
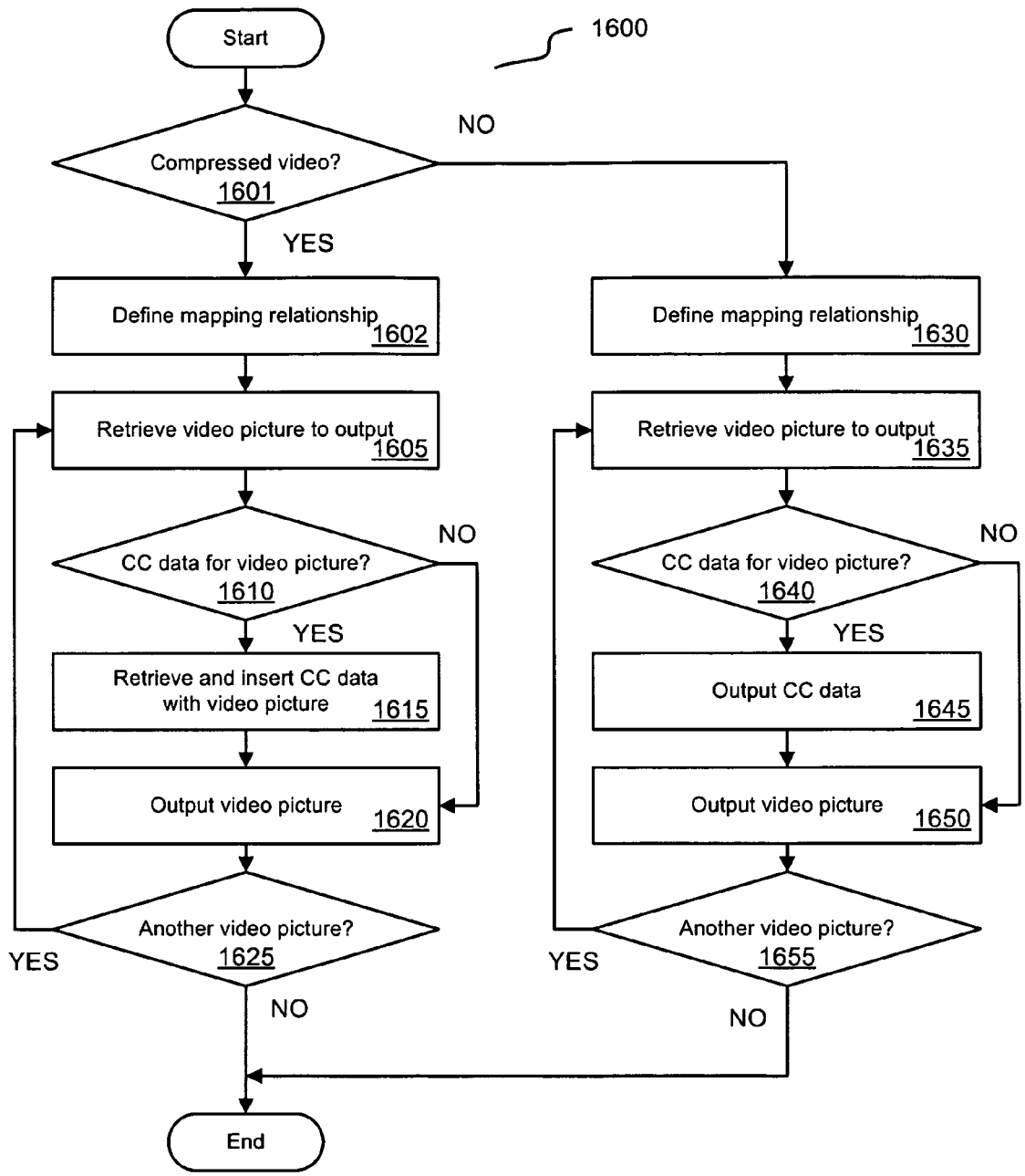
FIG. 16 illustrates a process 1600 that the output module 1410 performs to output a video clip.

Having described a specific example for outputting a digital video stream, a process for outputting digital video will now be described. FIG. 16 illustrates a process 1600 for outputting an HD digital video clip. In some embodiments, process 1600 is performed by an output module such as output module 1410.

As shown, the process determines (at 1601) whether the video stream to output is compressed (i.e., whether the video stream is a compressed video stream or an uncompressed video stream). For instance, if the video stream is being outputted to a DVD or over the Internet, it is more likely to be a compressed video stream. On the other hand, when the video stream is being outputted to an external device, it may be an uncompressed video stream.

Figures 18A, 18B:
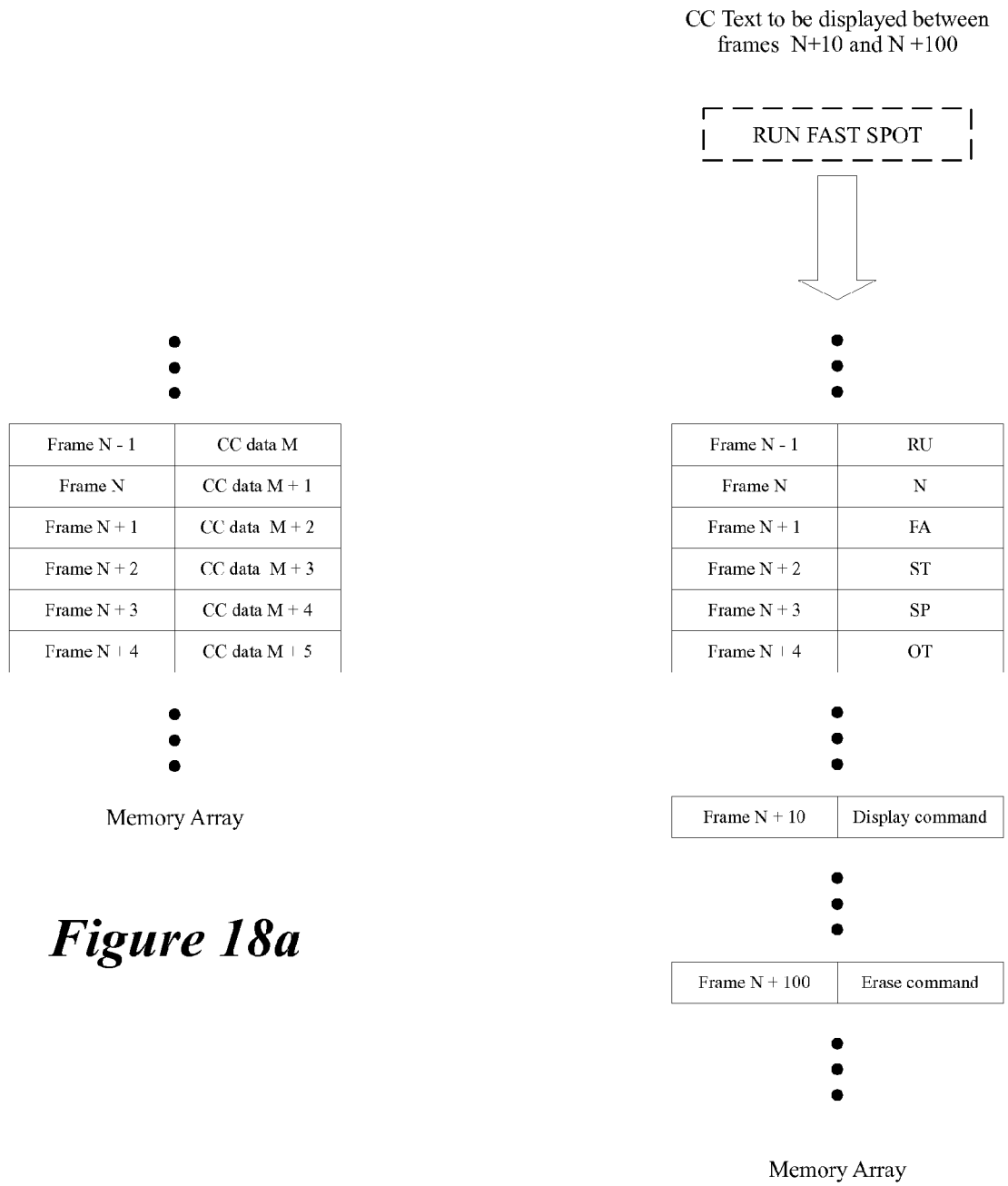
FIGS. 18a-18b illustrate several examples of different mapping relationships (e.g., memory array) and how edited audio/video data may be combined with closed captioning data in some embodiments.

When the video stream is uncompressed, the process proceeds to 1630, described below. Otherwise, the process defines (at 1602) a mapping relationship between edited audio/video data and the closed captioning data. The mapping relationship of some embodiments defines, for each closed captioning data, a particular video picture in which each closed captioning data will be inserted when an HD digital video stream is outputted. In some embodiments, the mapping relationship is defined by the callback module 1515 by using the timing information sent by the playback engine 1510. Some embodiments then pass this mapping relationship to the muxer module 1520. Since different embodiments can combine the audio/video data and closed captioning data differently, some embodiments generate a mapping relationship between the closed captioning data and video pictures. In such instances, the process can define a memory array that specifies which particular video picture a particular closed captioning data should be stored with (e.g., inserted into). FIGS. 18*a*-18*b* illustrate examples of mapping relationships (e.g., memory arrays) and how edited audio/video data can be combined with closed captioning data in some embodiments.

FIG. 18*a* illustrates a mapping relationship that defines how closed captioning data is stored with a video in a digital video stream. As shown in this figure, the closed captioning data M is stored with Frame N−1. The figure illustrates that each frame is specified to be stored with a particular closed captioning data. However, in some embodiments, more than one closed captioning data can be stored with a frame. In addition, some frames are not stored with any closed captioning data in some embodiments. Moreover, different embodiments define differently how closed captioning is stored. In some embodiments, there is an offset between where closed captioning data is stored and when it is displayed (e.g., closed captioning data stored in Frame 5 but displayed with Frame 50). The offset is defined by determining the number of characters that are to be displayed for a particular video picture and the number of bytes that can be stored in each video picture in some embodiments. For example, when 10 characters need to be displayed with a particular video picture, and each video picture can store 4 bytes (as in the case with CEA 608 video pictures), then the offset has to be at least 3 video pictures in some embodiments. However, other embodiments of the invention can define a different offset between when closed captioning data is displayed and where closed captioning data is stored. In some embodiments, there is no offset between when the closed captioning data is displayed and where the closed captioning data is stored (e.g., closed captioning data is stored with the video picture that the closed captioning data is displayed with).

FIG. 18*b* illustrates a specific example of how a mapping relationship is defined for a particular set of closed captioning data. As shown in this figure, the text "RUN FAST SPOT" is specified to be displayed between frames N+10 and N+100. In some embodiments, this can be specified through one or more timecodes for the closed captioning data that identify when the text is displayed. In other embodiments, this is specified through metadata that specifies which frames the text is displayed with. These metadata (e.g., timecode) are stored with the closed captioning data of some embodiments. As further shown in FIG. 18*b*, the letters "RU" is specified to be stored in Frame N−1 and the letter "N" is specified to be stored in frame N. FIG. 18*b* further illustrates that the letters "FA" are stored with Frame N+1, letters "ST" are stored with Frame N+2, letters "SP" are stored with Frame N+3, and letters "OT" are stored with Frame N+4. However, different embodiments may store the letters differently. In addition to the letters, some embodiments also define where closed captioning commands are stored. As shown in FIG. 18*b*, display command is defined for storage with Frame N+10 and erase command is defined for storage with Frame N+100. In some embodiments, the display and erase commands reference the text that is to be displayed or erased. In other cases, the commands automatically display or erase the most recent closed captioning data that has been received.

Returning to FIG. 16, after defining (at 1602) the mapping relationship, process 1600 then retrieves (at 1605) audio/video data for a particular video picture from the data storage. In some embodiments, the audio/video data is retrieved by a module such as playback engine 1510.

The process then determines (at 1610) whether there is closed captioning data to be outputted with the audio/video data. In some embodiments, the process looks at the mapping relationship (e.g., memory array) to determine whether there is closed captioning data to be outputted with audio/video data in the particular video picture. In some embodiments, the muxer module 1520 makes this determination.

When there is closed captioning data to output, the process retrieves and inserts (at 1615) the closed captioning data into the particular video picture. In some embodiments, the closed captioning data is retrieved by a muxer module (e.g., muxer module 1520). In some cases, the closed captioning is retrieved from cache memory. In other cases, the closed captioning data is retrieved directly from a file (e.g., a QuickTime file or a text file).

The process then outputs (at 1620) the video picture (e.g., with an output module such as output module 1535). In some embodiments, the video picture is outputted as a frame of an HD digital video. Different embodiments may output the video picture in different formats. For example, some embodiments may output the video pictures as DV25, DV50, DV100 or ProRes. The video pictures output by process 1600 have the format of one of data structures 400 or 500 in some embodiments. After outputting (at 1620) the video picture, the process determines (at 1625) whether there is another video picture to output. If so, the process retrieves (at 1605) another video picture. If not, the process ends.

When, at 1601, the process determines that the video stream is not compressed (i.e., that the video stream is an uncompressed video stream), the process defines (at 1630) a mapping relationship between edited audio/video data and the closed captioning data. The mapping relationship of some embodiments defines, for each closed captioning data, a particular video picture in which each closed captioning data will be inserted when an HD digital video stream is outputted. In some embodiments, the mapping relationship is the same whether the stream is compressed or uncompressed.

Process 1600 then retrieves (at 1635) audio/video data for a particular video picture from the data storage. In some embodiments, the audio/video data is retrieved by a module such as playback engine 1510.

The process then determines (at 1640) whether there is closed captioning data to be outputted with the audio/video data. In some embodiments, the process looks at the mapping relationship (e.g., memory array) to determine (at 1640) whether there is closed captioning data to be outputted with audio/video data in the particular video picture. When there is no closed captioning data, the process (at 1650) outputs the video picture (e.g., by output module 1535). However, when there is closed captioning data for the video picture, the process outputs (at 1645) the closed captioning data before outputting (at 1650) the video picture (e.g., by output module 1535). In some embodiments, the video picture and/or closed captioning data is outputted to a hardware device (e.g., a PCI card, tape deck, etc.) or a processing module of the hardware device. The hardware device or processing module then stores the closed captioning data with the appropriate video picture. In some embodiments, the closed captioning data is stored with the video picture that is outputted immediately after the output of the closed captioning data. The process ends when there are no more video pictures to output. In some embodiments, the closed captioning data is stored as pixel data in the uncompressed video picture (i.e., in pixels that are not meant to be displayed in part of the video picture).

Figure 17:
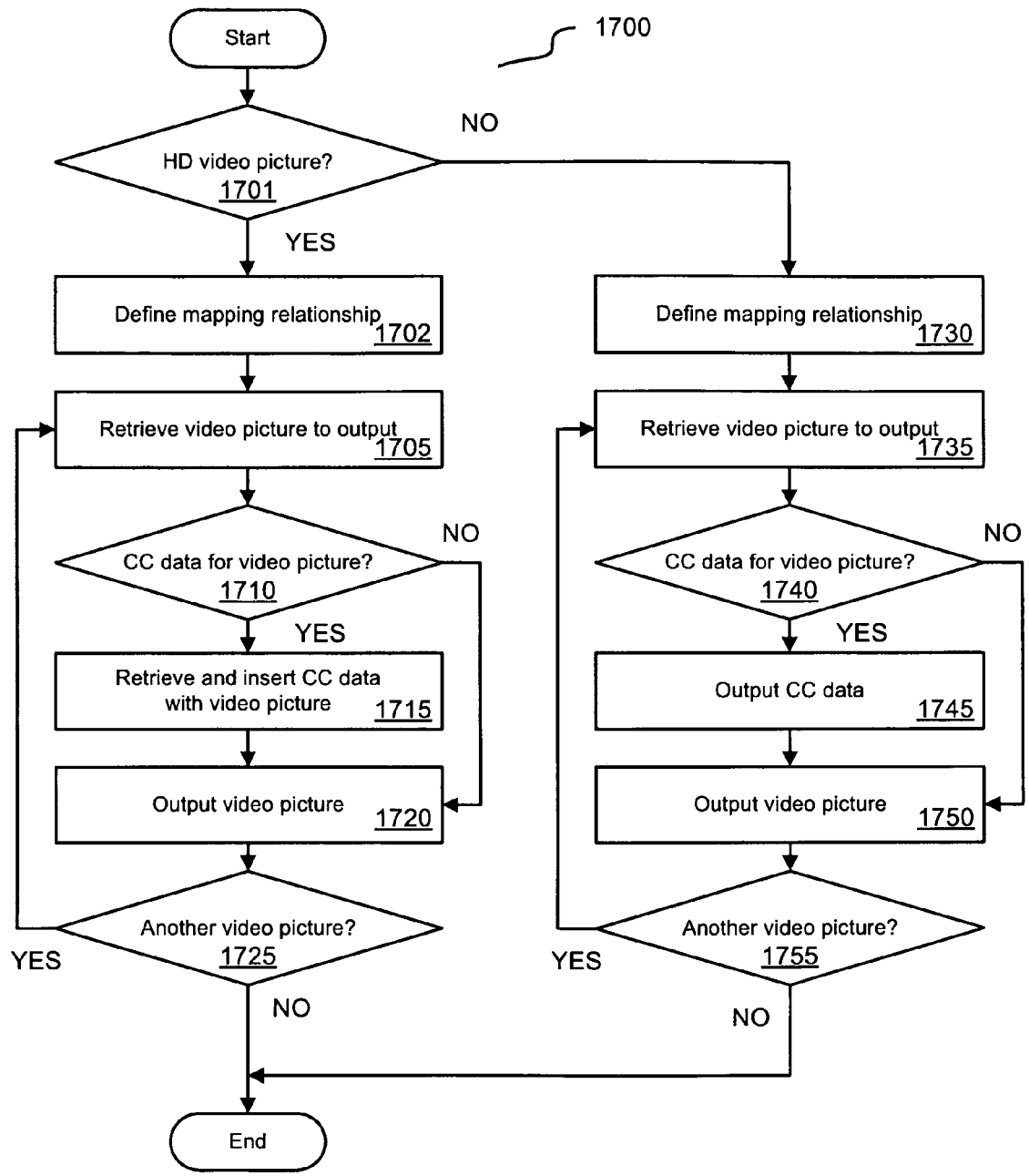
FIG. 17 illustrates a process 1700 that the output module 1410 performs to output an HD or standard definition video clip.

The above process is used for processing HD digital video streams. Some embodiments can process both standard definition and HD digital video streams. FIG. 17 illustrates a process 1700 of some embodiments that can process both compressed HD and standard definition video streams. FIG. 17 is similar to FIG. 16, except that process 1700 determines (at 1701) whether the video stream is an HD video stream. One of ordinary skill would recognize that a similar process could also be used to process uncompressed HD or standard definition video streams.

V. Editing Software Architecture

Having described the capturing of closed captioning data and the outputting of a digital video picture separately, the following section will now describe, in detail, several processes performed by some embodiments to capture closed captioning data and output digital video pictures as a digital video stream.

Figure 19:
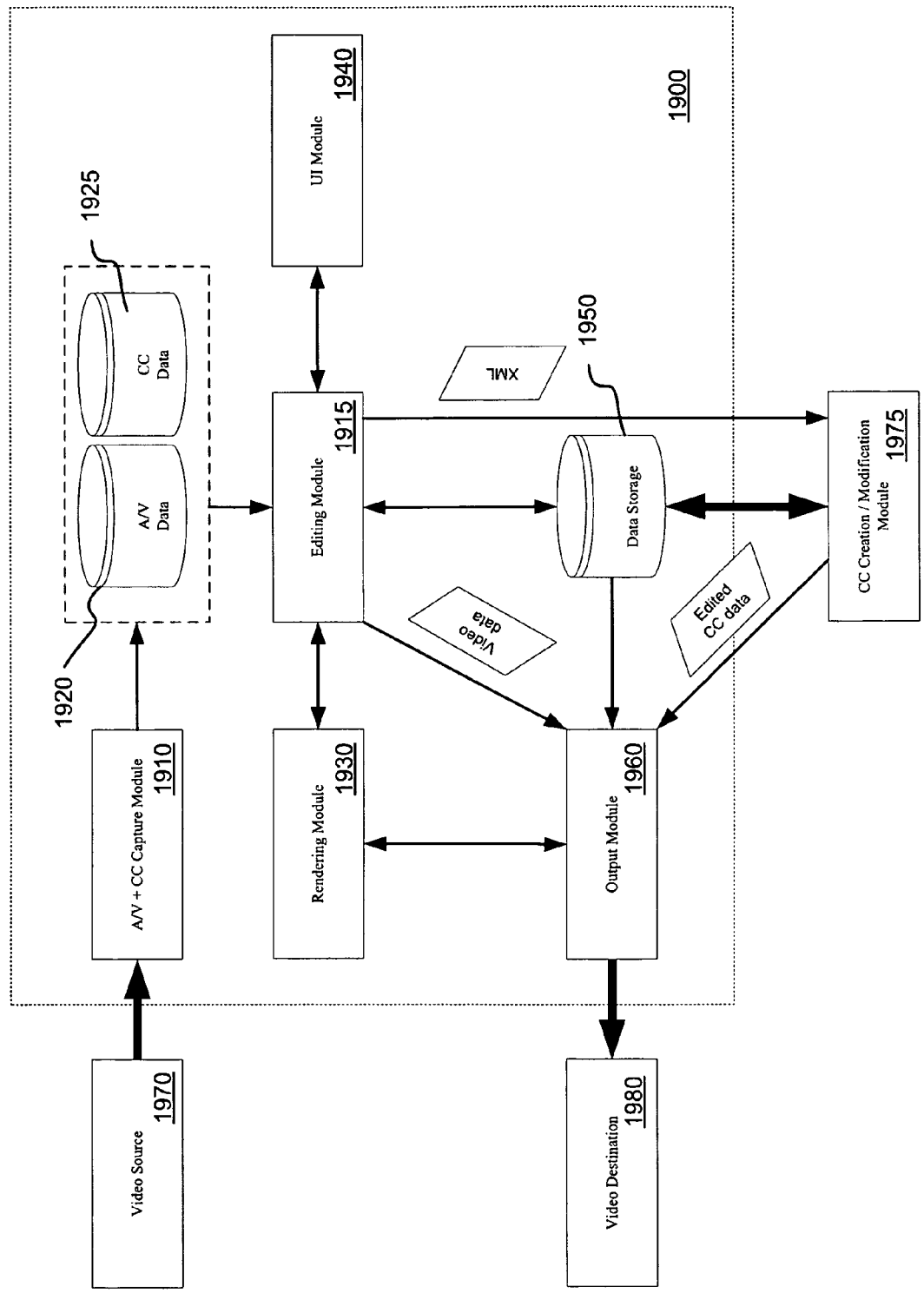
FIG. 19 illustrates a computer architecture 1900 that is a combination of the computer architectures 1000 and 1400 of FIGS. 10 and 14.

As mentioned above, FIG. 14 illustrates the software architecture of a media editing application 1400 used to output digital video according to some embodiments of the invention. FIG. 19 illustrates the software architecture of a media editing application 1900 of some embodiments for capturing video data and closed captioning data and outputting a HD video stream. In some embodiments, the software architecture combines the functionalities of the software architectures 1000 and 1400 of FIGS. 10 and 14. The computer system 1900 includes an audio/video and closed captioning capture module 1910, a video editing module 1915, rendering module 1930, UI module 1940, data storage 1950 and output module 1960. As shown in FIG. 19, the capture module 1910 receives a digital video stream (e.g., HD video) from a digital video source 1970 (e.g., a camera, tape deck, PCI board, network, etc.). In some embodiments, the capture module 1910 stores the video stream that it receives as audio/video data 1920 and closed captioning data 1925. In some embodiments, as illustrated, the audio/video data 1920 and the closed captioning data 1925 are stored in separate data storages. In other embodiments, the audio/video data 1920 and the closed captioning data 1925 are stored in one data storage. Alternatively, some embodiments first extract all audio/video data 1920 and store audio/video data 1920 as a file before extracting closed captioning data 1925. The closed captioning data 1925 is then stored with the audio/video data 1920 in the file in some embodiments.

Once the audio/video data and closed captioning data are stored, some embodiments edit the audio/video data 1920 and closed captioning data 1925. The editing module 1915 edits the audio/video data. Different editing modules may edit the audio/video data differently. In some embodiments, editing video data includes (i) combining the video with other video and/or audio clips, (ii) deleting parts of the imported video (e.g., removing frames from the imported video), (iii) changing the temporal position of at least one video picture (e.g., one frame) in the sequence of pictures that make up the imported video, (iv) adding special effects to the imported video, (v) changing visual attributes (e.g., luminance, chrominance) of the imported video, and/or (vi) generating new video.

In some cases, the editing of the audio/video data is performed according to instructions received from the UI module 1940. The UI module 1940 receives inputs from a user through a graphical user interface and provides the inputs to the editing module 1915. The audio/video data may be rendered by the rendering module 1930, which converts the audio/video data for display in some embodiments. After the audio/video data has been edited, some embodiments of the invention store the edited audio/video data in data storage 1950. In other embodiments, the editing module 1915 provides the video data to the output module 1960. In some embodiments, the closed captioning data in data storage 1950 is edited closed captioning data from a closed captioning creation/modification module 1975. The creation/modification module 1975 can be part of the media editing application or it can be separate from the media editing application (as illustrated in FIG. 19). In some embodiments, where the closed captioning creation/modification module 1975 is separate, the editing module 1915 provides an XML file (as described in Section II) to the creation/modification module 1975. The use of an XML file will further be described with reference to process 2200 and 2400 of FIGS. 22 and 24.

The output module 1960 retrieves the audio/video data and closed captioning data from the data storage 1950. In some embodiments, the output module 1960 retrieves edited closed captioning data from the creation/modification module 1975. The output module 1960 outputs a video stream (e.g., an HD video stream) to a digital video destination 1980 (e.g., a tape deck, PCI board, network, etc. . . . ). The video stream includes the audio/video data and closed captioning data.

As previously mentioned, the editing module 1915 can perform different editing operations on the audio/video data. In some embodiments, different editing operations may result in different output processes. Various different output processes are described below.

i. Edited Video Picture Does Not Change Temporal Sequence of a Video Clip

Figure 20:
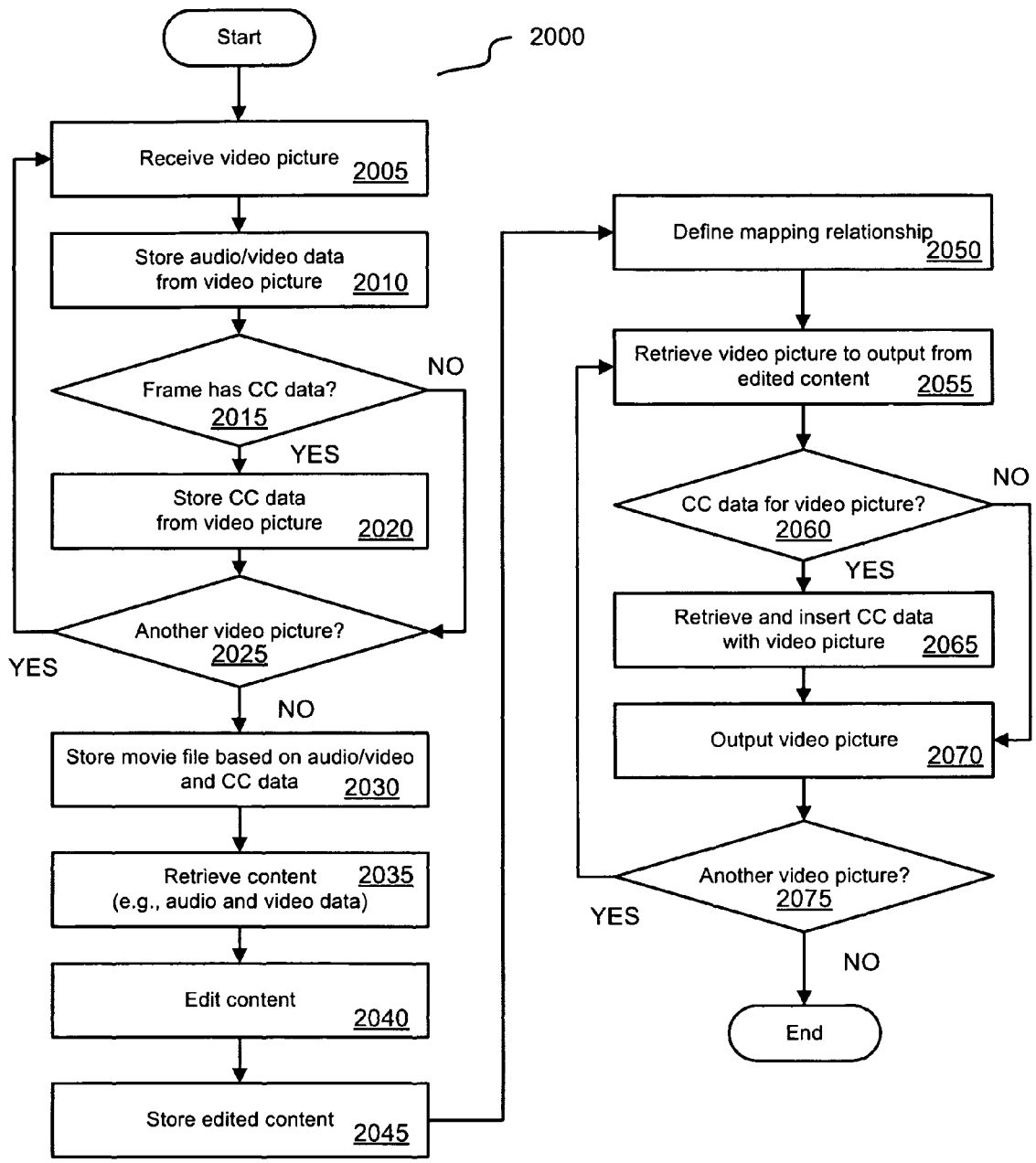
FIG. 20 illustrates a process 2000 that captures a digital video stream and outputs an edited digital video stream in some embodiments.

FIG. 20 conceptually illustrates a process 2000 of some embodiments that captures a digital video stream and outputs an edited digital video stream when the edits to the video pictures do not change the temporal sequence of the video stream. As shown in FIG. 20, the process 2000 initially receives (at 2005) a video picture from a digital video stream. The process stores (at 2010) the audio/video data for the received video picture. The process then determines (at 2015) whether there is closed captioning data stored with the video picture. If so, the process stores (at 2020) the closed captioning data for the video picture. The process then determines (at 2025) whether there is another video picture. If there is another video picture, the process proceeds back to 2005 and receives another video picture. When the process determines (at 2025) there are no more video pictures, the process stores (at 2030) all of the audio/video data and closed captioning data as a movie file (e.g., QuickTime file).

The process then retrieves (at 2035) audio/video content in the movie file. The process edits (at 2040) the retrieved audio/video content. In some embodiments, the editing of the audio/video content is performed by an editing module, such as editing module 1915. In some embodiments, editing video data includes adding special effects to the imported video, changing visual attributes (e.g., luminance, chrominance) of the imported video, etc., so long as the edits do not modify the temporal sequence of the video pictures in the video. After editing the audio/video data, the process stores (at 2045) the edited audio/video content.

The process defines (at 2050) a mapping relationship between edited audio/video data and the closed captioning data. In some embodiments, the mapping relationship specifies how a particular closed captioning data that is associated with a particular video picture is stored in the outputted digital video. The mapping relationship may be defined as a memory array, as shown in FIGS. 18*a*-18*b* above, in some embodiments. The process then retrieves (at 2055) audio/video data for a particular video picture. In some embodiments, the audio/video data is retrieved by a playback engine (e.g., playback engine 1510) from a source file (e.g., movie file). The process determines (at 2060) whether there is closed captioning data to be outputted with audio/video data. In some embodiments, the process looks at the mapping relationship (e.g., memory array) to determine (at 2060) whether there is closed captioning data to be outputted with audio/video data in the particular video picture. If there is closed captioning data, the process retrieves and inserts (at 2065) the closed captioning data in the particular video picture. In some embodiments, the closed captioning data is retrieved by a muxer module (e.g., muxer module 1520). After determining (at 2060) that there is no closed captioning data for the video picture or inserting (at 2065) the closed captioning data, the process outputs (at 2070) the video picture. After outputting (at 2070) the video picture, the process determines (at 2075) whether there is another video picture to output. If so, the process retrieves (at 2055) another video picture. Once all video pictures are outputted, the process ends.

Figure 21:
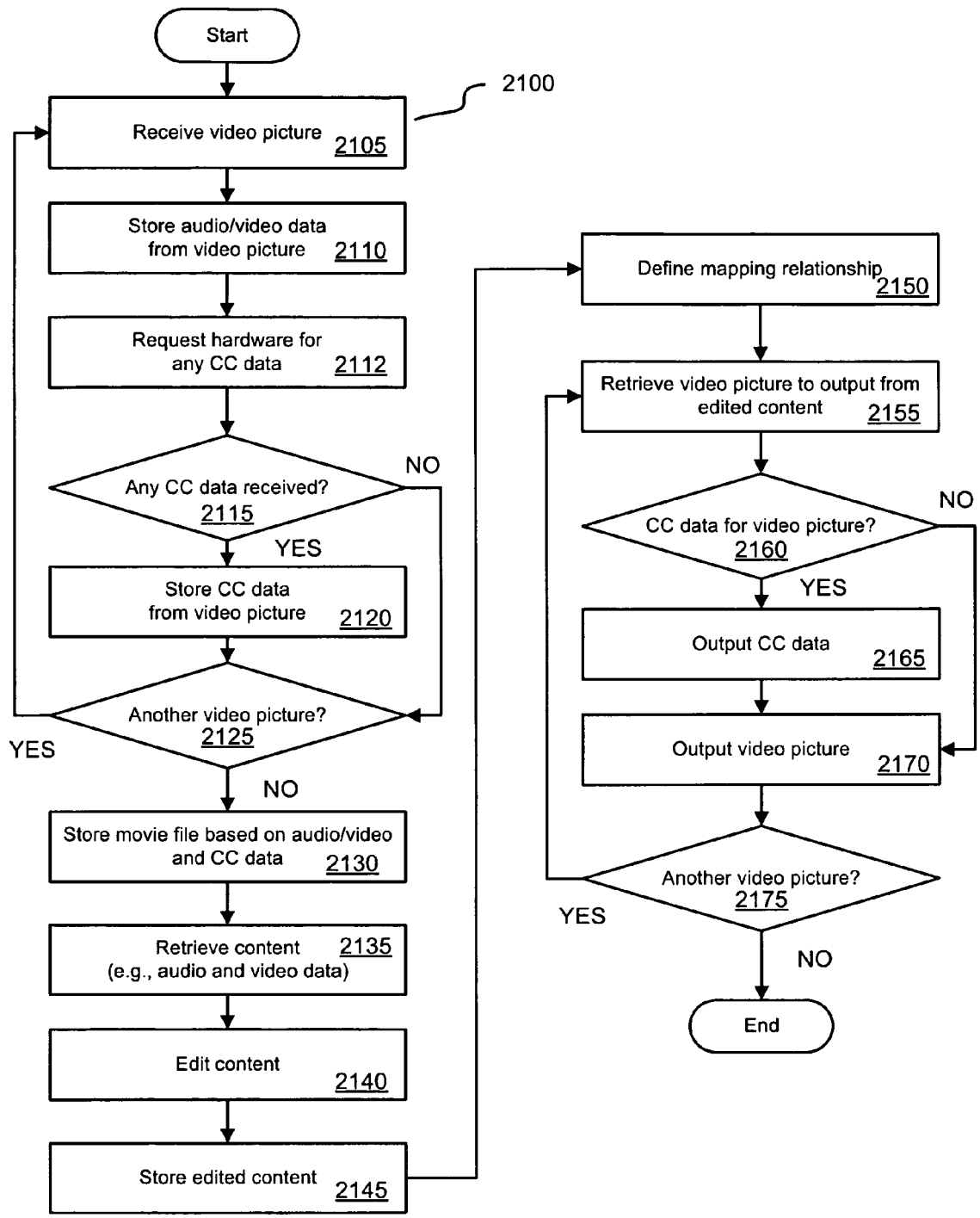
FIG. 21 illustrates a process 2100 that captures an uncompressed digital video stream and outputs an edited digital video stream in some embodiments.

In some embodiments, the above process 2000 is performed for a compressed video stream, as described. However, a similar process can also be used for processing an uncompressed video stream. FIG. 21 illustrates a process 2100 for processing an uncompressed video stream. As shown in this figure, the process 2100 is similar to process 2000 of FIG. 20. In some embodiments, the differences between process 2000 and process 2100 is that for process 2100, (i) the closed captioning data is extracted by a hardware device (e.g., PCI board, I/O device, tape deck) and received separately by the process after the process requests the hardware device for the CC data (at 2112) and (ii) the closed captioning data is outputted separately by the process (at 2165) and combined with the audio/video data as a video stream by the hardware device.

ii. Edited Video Picture Changes Temporal Sequence of a Video Clip

Figure 22:
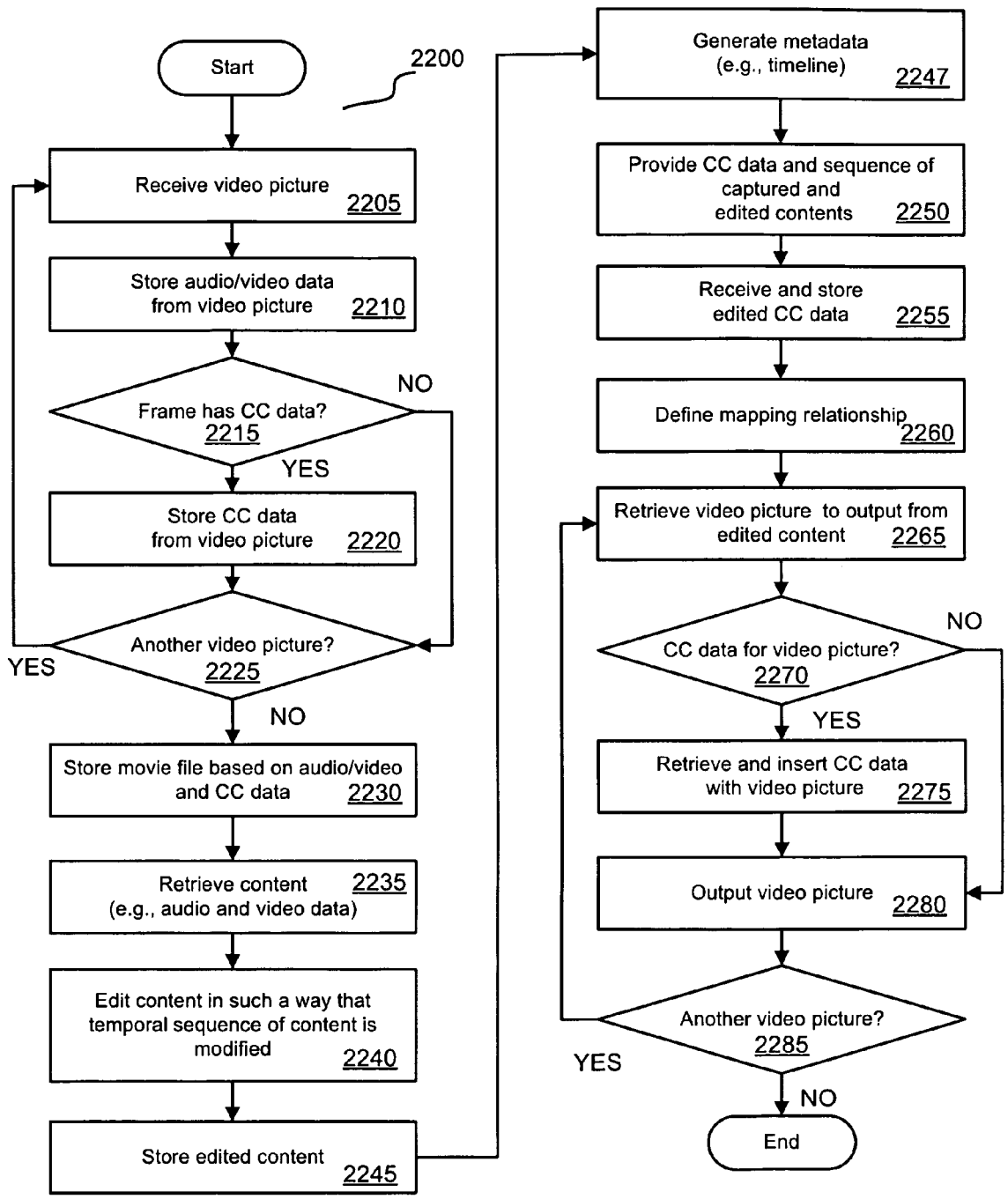
FIG. 22 illustrates a process 2200 that captures a digital video stream and outputs an edited digital video stream in some embodiments.

FIG. 22 illustrates a process 2200 that captures a digital video stream and outputs an edited digital video stream when edits to the video pictures of the digital video stream change the temporal sequence of the digital video stream. As shown in FIG. 22, the process 2200 initially receives (at 2205) a video picture from a digital video stream. The process stores (at 2210) the audio/video data for that video picture. The process then determines (at 2215) whether there is closed captioning data stored with the video picture. If so, the process stores (at 2220) the closed captioning data. The process then determines (at 2225) whether there is another video picture. If there is another video picture, the process proceeds back to 2205 and receives another video picture. When the process determines (at 2225) that there are no more video pictures, the process stores (at 2230) all of the audio/video data and closed captioning data in a movie file (e.g., QuickTime movie).

The process then retrieves (at 2235) audio/video content in the movie file. The process edits (at 2240) the retrieved audio/video content in such a way that the temporal sequence of content is modified. In some embodiments, editing the audio/video data includes deleting a particular video picture and/or adding a new video picture. In some embodiments, editing the audio/video data includes changing the temporal position of at least one video picture in a sequence of video pictures. In some embodiments, other editing is also performed that does not modify the temporal sequence of the content (e.g., modifying the visual attribute of a particular video picture). After editing the audio/video data, the process stores (at 2245) the edited audio/video content.

The process generates (at 2247) metadata related to the edits made to the video data. In some embodiments, the metadata (e.g., sequence) is stored in an XML file (as described in Section II). The process provides (at 2250) closed captioning data and a sequence to a closed captioning module (e.g., closed captioning module 1975). In addition to providing the sequence, some embodiments also provide the edited audio/video data. In some embodiments, the closed captioning module is separate from an editing application that includes an editing module (e.g., editing module 1915). In other embodiments, the closed captioning module is part of the editing application.

After providing (at 2250) the data, the process receives and stores (at 2255) the edited closed captioning data. In some embodiments, the edited closed captioning data is stored in cached memory. The process defines (at 2260) a mapping relationship between edited audio/video data and the edited closed captioning data. In some embodiments, the mapping relationship specifies how a particular closed captioning data that is associated with a particular video picture is stored in the outputted digital video. The mapping relationship may be defined as a memory array, as shown in FIGS. 18*a*-18*b*, in some embodiments. The process then retrieves (at 2265) audio/video data for a particular video picture. In some embodiments, the audio/video data is retrieved by a playback engine (e.g., playback engine 1510) from a source file (e.g., movie file). The process determines (at 2270) whether there is closed captioning data to be outputted with audio/video data. In some embodiments, the process looks at the mapping relationship (e.g., memory array) to determine (at 2270) whether there is closed captioning data to be outputted with audio/video data in the particular video picture. If there is closed captioning data, the process retrieves and inserts (at 2275) the closed captioning data in the particular video picture. In some embodiments, the closed captioning data is retrieved by a muxer module (e.g., muxer module 1520). After determining (at 2270) there is no closed captioning data for the video picture or inserting (at 2275) the closed captioning data, the process outputs (at 2280) the video picture. After outputting (at 2280) the video picture, the process determines (at 2285) whether there is another video picture to output. If so, the process retrieves (at 2265) another video picture. Once all video pictures are outputted, the process ends.

Figure 23:
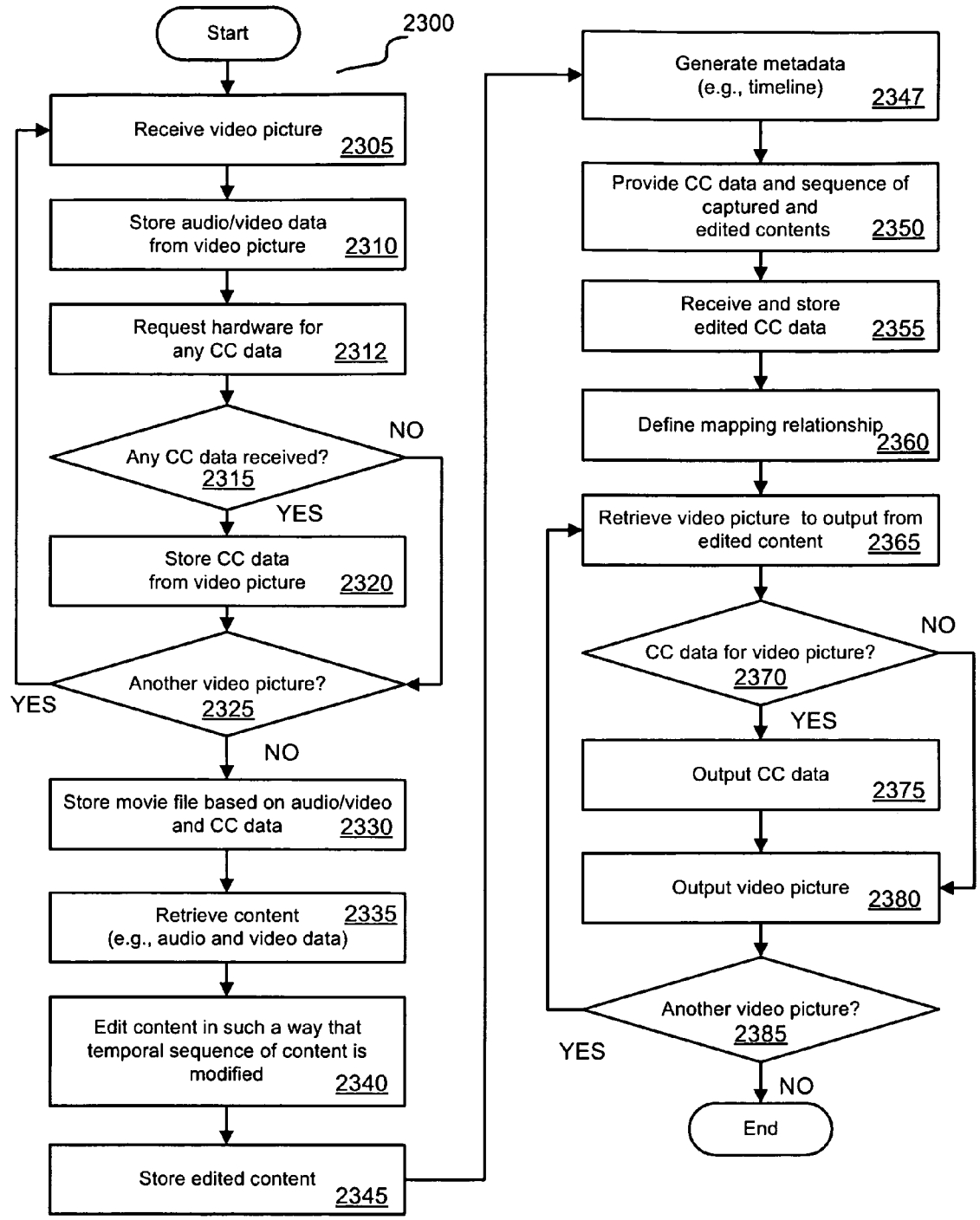
FIG. 23 illustrates a process 2300 that captures an uncompressed digital video stream and outputs an edited uncompressed digital video stream in some embodiments.

In some embodiments, the above process 2200 is performed for a compressed video stream, as described. However, a similar process can also be used for processing an uncompressed video stream. FIG. 23 illustrates a process 2300 for processing an uncompressed video stream. As shown in this figure, the process 2300 is similar to process 2200 of FIG. 22. In some embodiments, the differences between process 2200 and process 2300 is that for process 2300, (i) the closed captioning data is extracted by a hardware device (e.g., PCI board, I/O device, tape deck) and received separately by the process after the process requests the hardware device for the CC data (at 2312) and (ii) the closed captioning data is outputted separately by the processor (at 2375) and combined with the audio/video data as a video stream by the hardware device.

iii. Generating New Video Pictures

Figure 24:
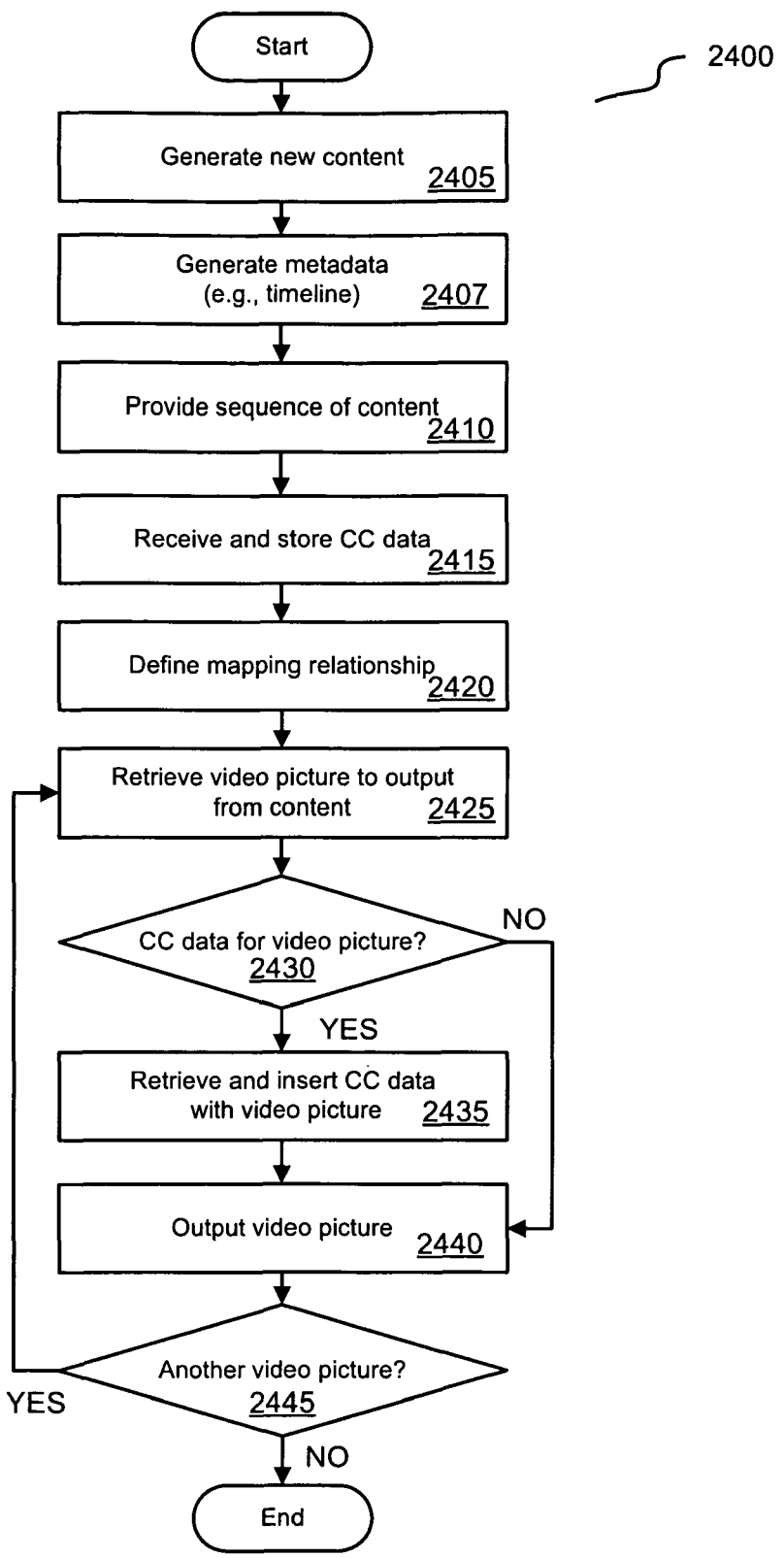
FIG. 24 illustrates a process 2400 that creates new video pictures and outputs a new digital video stream in some embodiments.

FIG. 24 illustrates a process 2400 that generates new video pictures and outputs a new digital video stream in some embodiments. As shown in FIG. 24, the process generates (at 2405) new audio/video content. In some embodiments, the creating of the audio/video content is performed by the editing module 1915. After generating the audio/video content, the process generates (at 2407) metadata related to the created video data. In some embodiments, the metadata (e.g., sequence) is stored in an XML file (as described in Section II). After the metadata is generated (at 2407), the process provides (at 2410) closed captioning data and a sequence to a closed captioning module (e.g., closed captioning data module 1975). In addition, some embodiments also provide the generated audio/video content. In some embodiments, the closed captioning module is separate from an editing application that includes an editing module (e.g., module 1915), while in some embodiments, the closed captioning module is part of the editing application.

After providing (at 2410) the data, the process receives and stores (at 2415) the generated closed captioning data. In some embodiments, the generated closed captioning data is stored in cached memory. The process defines (at 2420) a mapping relationship between edited audio/video data and the edited closed captioning data. In some embodiments, the mapping relationship specifies how a particular closed captioning data that is associated with a particular video picture is stored in the outputted digital video. The mapping relationship may be defined as a memory array, as shown in FIGS. 18*a*-18*b*, in some embodiments.

The process then retrieves (at 2425) audio/video data for a particular video picture. In some embodiments, the audio/video data is retrieved by a playback engine (e.g., playback engine 1510) from a source file (e.g., movie file). The process then determines (at 2430) whether there is closed captioning data to be outputted with audio/video data. In some embodiments, the process looks at the mapping relationship (e.g., memory array) to determine (at 2430) whether there is closed captioning data to be outputted with audio/video data in the particular video picture. If there is closed captioning data, the process retrieves and inserts (at 2435) the closed captioning data in the particular video picture. In some embodiments, the closed captioning data is retrieved by a muxer module (e.g., muxer module 1520). After determining (at 2430) there is no closed captioning data for the video picture or inserting (at 2435) the closed captioning data, the process outputs (at 2440) the video picture. After outputting (at 2440) the video picture, the process determines (at 2445) whether there is another video picture to output. If so, the process retrieves (at 2425) another video picture. Once all video pictures are outputted, the process ends.

Figure 25:
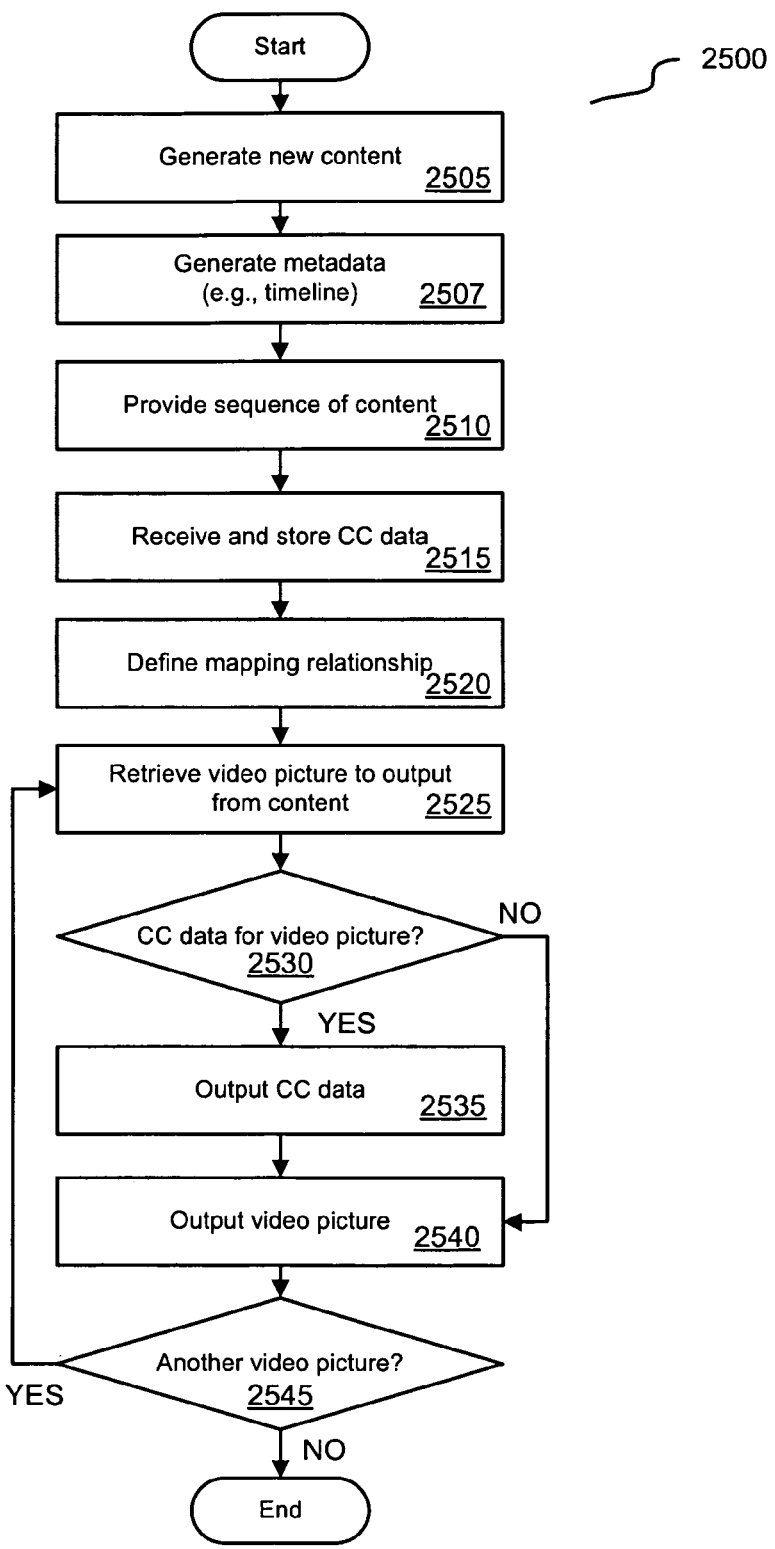
FIG. 25 illustrates a process 2500 that creates new video pictures and outputs a new uncompressed digital video stream in some embodiments.

In some embodiments, the above process 2400 is performed for a compressed video stream, as described. However, a similar process can also be used for processing an uncompressed video stream. FIG. 25 illustrates a process 2500 for processing an uncompressed video stream. As shown in this figure, the process 2500 is similar to process 2400 of FIG. 24. In some embodiments, the differences between process 2400 and process 2500 is that for process 2500, the closed captioning data is outputted separately by the process (at 2535) and combined with the audio/video data as a video stream by the hardware device (e.g., PCI board, I/O device, tape deck).

Figure 26:
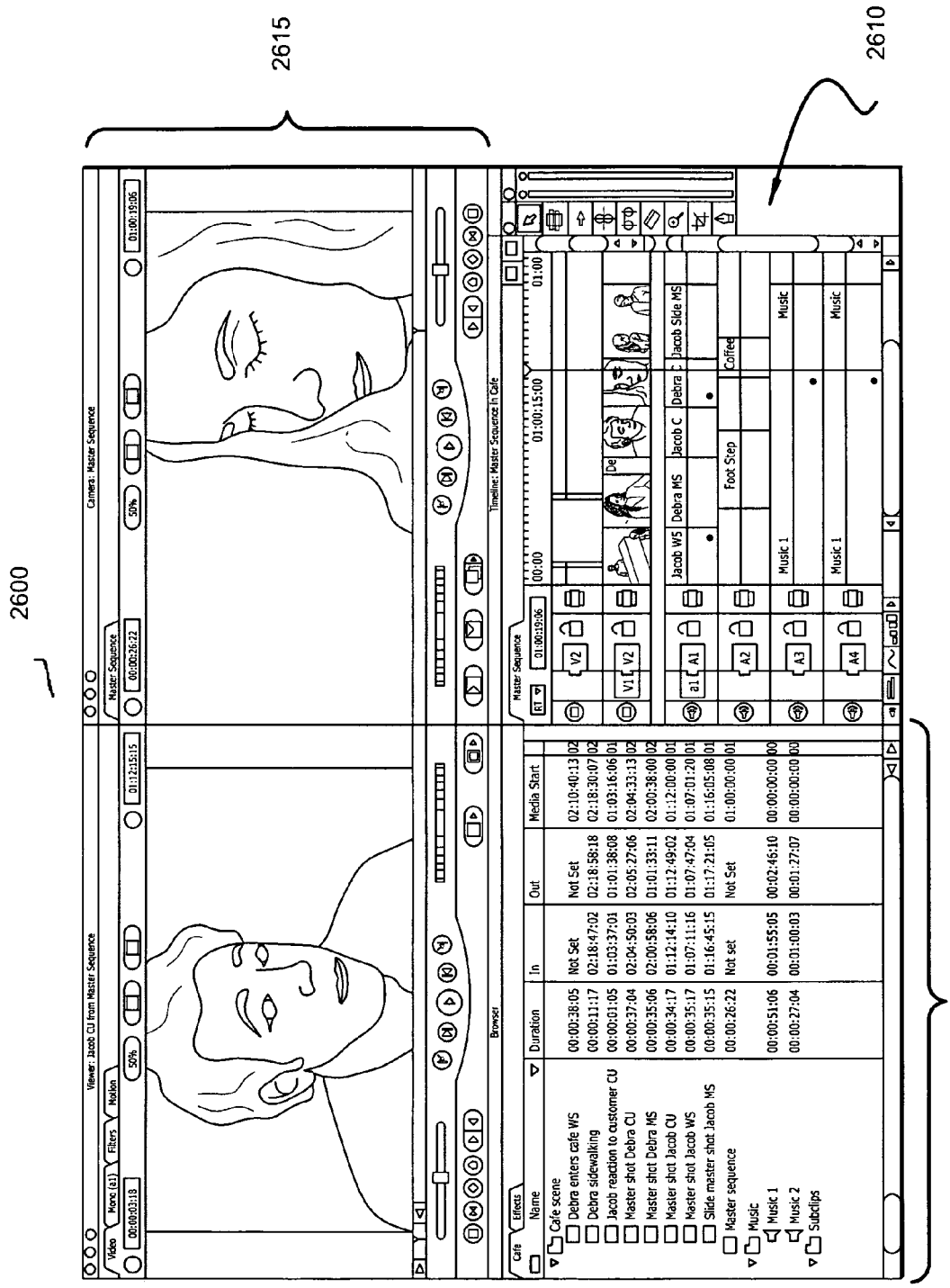
FIG. 26 illustrates a screen shot of an editing application that includes tools for editing HD digital video in some embodiments.

As previously mentioned, some of the above processes may be performed by a video editing application. FIG. 26 illustrates an example of a screen shot 2600 from a video editing application of some embodiments that is used to edit video data. FIG. 26 illustrates a list of video clips 2605, video editing tools 2610, and video displays 2615.

The list of video clips 2605 includes video clips along with metadata (e.g., timecode information) about the video clips. In some embodiments, the list of video clips is the list of video clips in a particular sequence of video clips, and the metadata specifies in and out points, durations, etc. for the video clips. In some embodiments, the data displayed in the list of video clips 2605 is the data that is written to a reference file such as the XML code 900 illustrated in FIG. 9 for use by an external closed captioning creation and modification application.

The video editing tools 2610 include tools that allow a user to graphically set in and out points for video clips (in other words, where in the final product a specific clip or part of a clip will be shown). For instance, the video editing tools 2610 include a number of timelines that can be used to modify the temporal sequence of the video frame and to synchronize audio tracks with video tracks (e.g., in order to add music over a video clip). In some embodiments, video editing tools 2610 also give users the ability to edit in effects or perform other video editing functions.

Video displays 2615 allow a user to watch multiple video clips at once, thereby enabling easier selection of in and out points for the video clips. The screen shot 2600 illustrates a few of many different editing tools that a video editing application of some embodiments may have to edit digital video.

In some cases, some or all of the video clips that are displayed in the list of video clips 2605, played in displays 2615, and edited by a user with video editing tools 2610, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Figure 27:
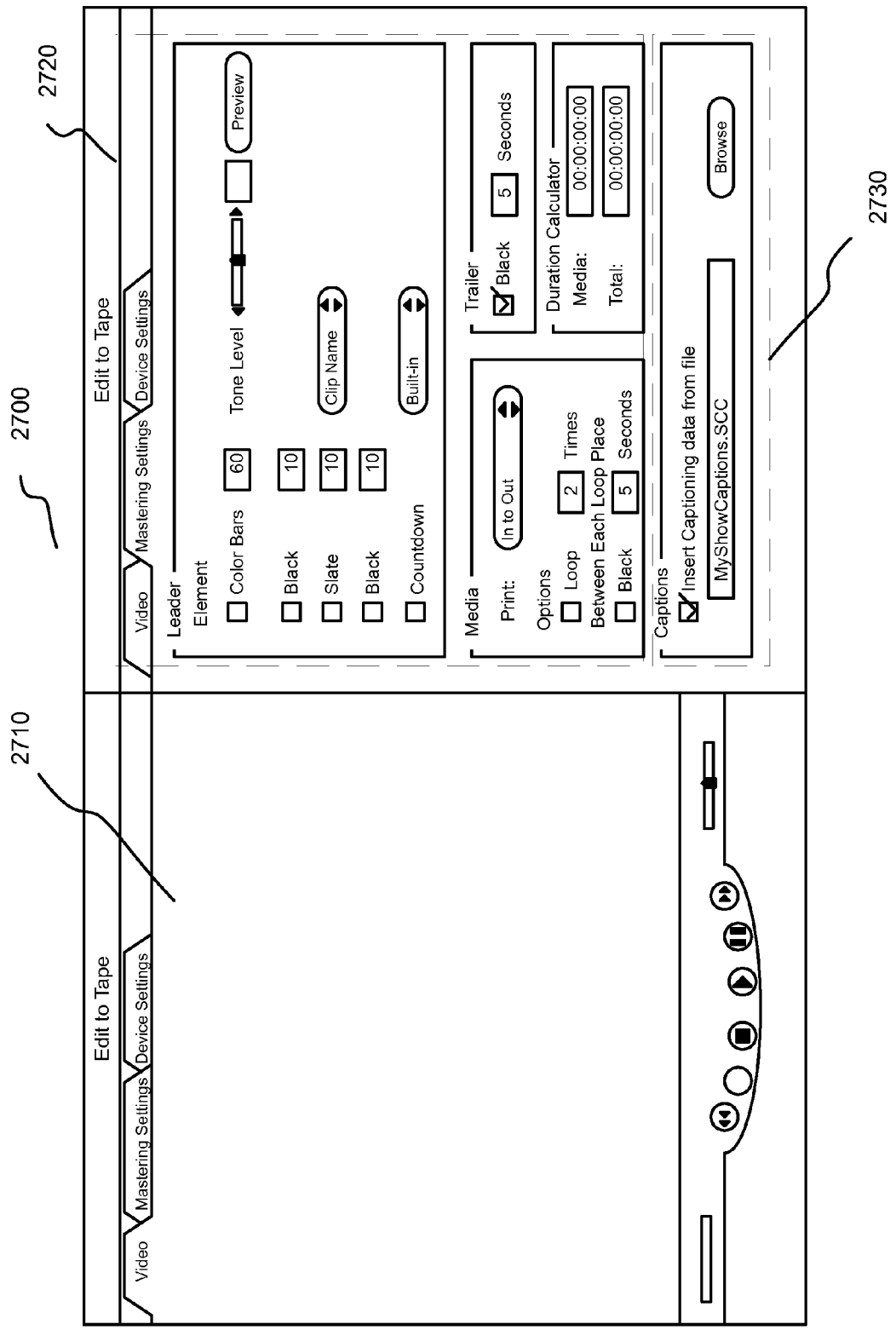
FIG. 27 illustrates a screen shot of an editing application that includes tools for outputting HD digital video with closed captioning data in some embodiments.

FIG. 27 illustrates an example of a screen shot 2700 from a video editing application of some embodiments that is used to output an HD digital video that includes closed captioning data. FIG. 27 illustrates a display area 2710, video tools 2720, and a closed captioning tool 2730. The display area 2710 is an area of a graphical user interface that allows a video to be viewed and/or previewed. The video tools 2720 are various graphical user interface tools that allow a user to specify how video is outputted. In some embodiments, the video tools 2720 includes tools for specifying the tone level of the outputted video and any introductory frames. The closed captioning tool 2730 allows a user to specify the location of closed captioning data (e.g., an SCC file as described in Section II) that is inserted in a digital video that is outputted.

VI. Computer System

Figure 28:
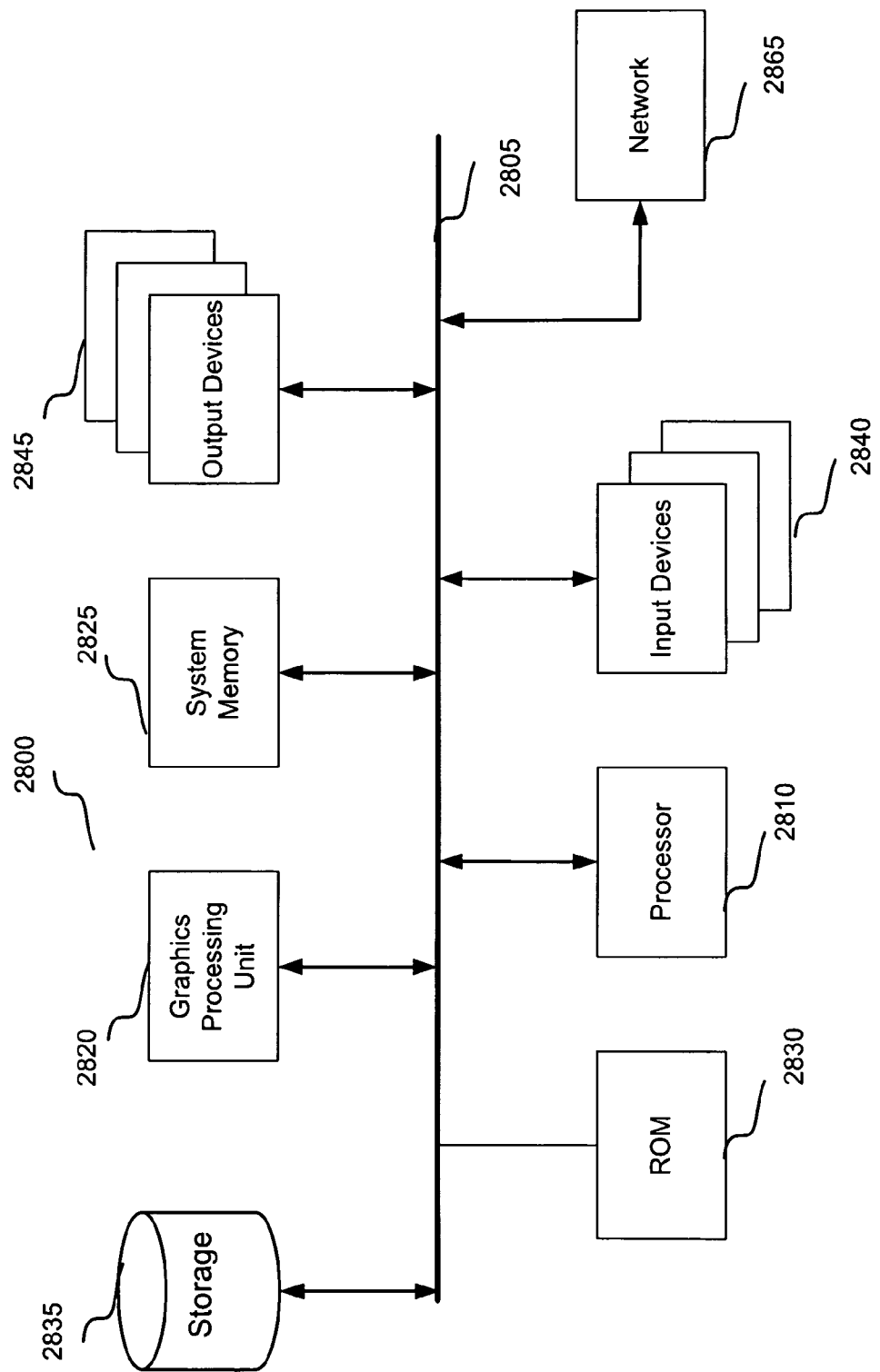
FIG. 28 conceptually illustrates a computer system with which some embodiments of the invention are implemented.

Computer programs for implementing some embodiments are executed on computer systems. FIG. 28 illustrates a computer system with which some embodiments of the invention are implemented. Such a computer system includes various types of computer readable media and interfaces for various other types of computer readable media. Computer system 2800 includes a bus 2805, a processor 2810, a graphics processing unit (GPU) 2820, a system memory 2825, a read-only memory 2830, a permanent storage device 2835, input devices 2840, and output devices 2845.

The bus 2805 collectively represents all system, peripheral, and chipset buses that communicatively connect the numerous internal devices of the computer system 2800. For instance, the bus 2805 communicatively connects the processor 2810 with the read-only memory 2830, the GPU 2820, the system memory 2825, and the permanent storage device 2835.

From these various memory units, the processor 2810 retrieves instructions to execute and data to process in order to execute the processes of the invention. Some instructions are passed to and executed by the GPU 2820. The GPU 2820 can offload various computations or complement the image processing provided by the processor 2810.

The read-only-memory (ROM) 2830 stores static data and instructions that are needed by the processor 2810 and other modules of the computer system. The permanent storage device 2835, on the other hand, is a read-and-write memory device. This device is a non-volatile memory unit that stores instructions and data even when the computer system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, or ZIP® disk, and its corresponding disk drive) as the permanent storage device. Like the permanent storage device 2835, the system memory 2825 is a read-and-write memory device. However, unlike storage device 2835, the system memory is a volatile read-and-write memory, such as random access memory. The system memory stores some of the instructions and data that the processor needs at runtime. In some embodiments, the invention's processes are stored in the system memory 2825, the permanent storage device 2835, and/or the read-only memory 2830.

The bus 2805 also connects to the input and output devices 2840 and 2845. The input devices enable the user to communicate information and select commands to the computer system. The input devices 2840 include alphanumeric keyboards and pointing devices (also called "cursor control devices"). The output devices 2845 display images generated by the computer system. For instance, these devices display a GUI. The output devices include printers and display devices, such as cathode ray tubes (CRT) or liquid crystal displays (LCD).

Finally, as shown in FIG. 28, bus 2805 also couples computer 2800 to a network 2865 through a network adapter (not shown). In this manner, the computer can be a part of a network of computers (such as a local area network ("LAN"), a wide area network ("WAN"), or an Intranet, or a network of networks, such as the Internet. For example, the computer 2800 may be coupled to a web server (network 2865) so that a web browser executing on the computer 2800 can interact with the web server as a user interacts with a GUI that operates in the web browser.

Any or all components of computer system 2800 may be used in conjunction with the invention. For instance, in some embodiments the execution of the rendering of the frames is performed by the GPU 2820 instead of the CPU 2810. Similarly, other image editing functions can be offloaded to the GPU 2820 where they are executed before the results are passed back into memory or the processor 2810. However, a common limitation of the GPU 2820 is the number of instructions that the GPU 2820 is able to store and process at any given time. Therefore, some embodiments adapt instructions for implementing processes so that these processes fit onto the instruction buffer of the GPU 2820 for execution locally on the GPU 2820. Additionally, some GPUs 2820 do not contain sufficient processing resources to execute the processes of some embodiments and therefore the CPU 2810 executes the instructions. One of ordinary skill in the art would appreciate that any other system configuration may also be used in conjunction with the present invention.

As mentioned above, the computer system 2800 may include any one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, and floppy disks.

While the invention has been described with reference to numerous specific details, one of ordinary skill in the art will recognize that the invention can be embodied in other specific forms without departing from the spirit of the invention. In some embodiments, not all temporal changes to video data may result in changes to which video picture closed captioning data is stored with. For example, adding video data at the beginning of a video sequence may not change where closed captioning data is stored (i.e., closed captioning data are stored with the same video pictures as before the editing of the video pictures), in some embodiments. Additionally, adding video data at the end of a video sequence may result in closed captioning data being stored in earlier video pictures, in some embodiments. However, different embodiments may specify differently how and where closed captioning data is stored.

Furthermore, the processes described in FIGS. 20-25 can also be modified in a similar fashion to FIGS. 13 and 17 to process HD or standard video streams.

All of the above figures illustrate that the determination of whether a video stream is an HD video stream or a standard video stream or compressed or uncompressed is made by the process that performs the extraction and/or outputting. However, in some embodiments, the determination of whether the video stream is compressed or uncompressed is made by a hardware device (e.g., camera, PCI board, I/O device, etc).

Furthermore, many of the features have been described as being performed by one particular module (e.g., the editing module 1015 of FIG. 10 or the capture module 1910 of FIG. 19). However, one of ordinary skill would recognize that the functions attributed to these modules might be split up into multiple modules, and the performance of one feature might even require multiple modules. Similarly, multiple features that are described as being performed by multiple modules might in fact be performed by a single module. A module is a set of processes in some embodiments.

Thus, one of ordinary skill in the art would understand that the invention is not to be limited by the foregoing illustrative details, but rather is to be defined by the appended claims.

We claim:

1. A method for processing digital video, the method comprising:
    receiving a high definition ("HD") digital video comprising video data and closed captioning data that is stored in a first format in the HD digital video;
    extracting the closed captioning data from said HD digital video; and
    storing said extracted closed captioning data in a second format that is different from the first format.

2. The method of claim 1, wherein the receiving, extracting, and storing are performed by a video editing application.

3. The method of claim 1 further comprising extracting said video data from said HD digital video and storing said extracted video data with said extracted closed captioning data in a digital video file using said second format.

4. The method of claim 3, wherein said second format is a QuickTime format.

5. The method of claim 1, wherein said extracted closed captioning data is stored in a track of a digital video file that is different from the HD digital video.

6. The method of claim 1 further comprising:
    extracting said video data from said HD digital video; and
    editing said extracted video data.

7. The method of claim 6, wherein the HD digital video is a first HD digital video, the method further comprising:
    defining a second HD digital video based on said edited video data and said closed captioning data; and
    outputting said second HD digital video comprising said edited video data and said closed captioning data.

8. The method of claim 7, wherein defining said second HD digital video based on said edited video data and said closed captioning data comprises defining said second HD digital video based on said edited video data and closed captioning data that has been edited.

9. A method for processing digital video, the method comprising:
    receiving a first high definition ("HD") digital video comprising video data and closed captioning data;
    extracting video data and closed captioning data from said first HD digital video;
    storing said extracted closed captioning data;
    editing said extracted video data;
    providing sequences of said video data, said edited video data, and said extracted closed captioning data;
    receiving edited closed captioning data based on said sequences of said video data and said edited video data; and
    defining a second HD digital video based on said edited video data and said edited closed captioning data.

10. A method for processing digital video, the method comprising:
    editing video data;
    retrieving closed captioning data;
    defining a mapping relationship between said edited video data and said closed captioning data; and
    defining a high definition ("HD") digital video based on said edited video data and said closed captioning data.

11. The method of claim 10 further comprising outputting said HD digital video comprising said edited video data and said closed captioning data.

12. The method of claim 11, wherein said closed captioning data is stored separately from said edited video data in said HD digital video.

13. The method of claim 10, wherein said mapping relationship specifies how a particular part of the closed captioning data is associated with a particular video picture stored in the HD digital video.

14. The method of claim 13, wherein said edited video data comprises first and second video pictures, wherein said closed captioning data comprises first and second closed captioning data, wherein said second closed captioning data is for display with said second video picture, wherein said second closed captioning data is stored with said first video picture in said HD digital video.

15. The method of claim 10, wherein the editing, retrieving, and defining are performed by a video editing application.

16. A method for processing digital video, the method comprising:
    selecting a set of video clips from a storage;
    applying one or more editing operations to the selected video clips to generate a composite video clip, wherein at least one of the selected video clips has associated closed captioning data;
    merging the composite video clip with the closed captioning data for the selected video clips to produce a high definition (HD) digital video stream; and
    outputting the HD digital video stream.

17. The method of claim 16, wherein the composite video clip comprises a plurality of digital video pictures.

18. The method of claim 17, wherein merging the composite video clip with the closed captioning data comprises mapping the closed captioning data to the digital video pictures.

19. The method of claim 18, wherein merging the composite video clip with the closed captioning data further comprises inserting closed captioning data into the digital video pictures based on the mapping.

20. The method of claim 18, wherein the closed captioning data comprises a plurality of pieces of data, wherein the mapping comprises identifying a digital video picture for each piece of data.

21. The method of claim 16, wherein the editing operations include defining the composite video clip by specifying (i) portions of the selected video clips that are part of the composite video clip and (ii) an order of the portions for the composite video clip.

22. The method of claim 21 further comprising, after applying the editing operations, generating metadata that includes information about the specified portions and the order.

23. The method of claim 22, wherein the metadata is sent to an external application, the method further comprising receiving closed captioning data from the external application for merging with the composite video clip.

24. The method of claim 16, wherein the selecting, merging, applying, and outputting are performed by a video-editing application.

25. A non-transitory computer readable medium storing a media-editing application that when executed by at least one processing unit processes digital video, the media-editing application comprising:
  a capture module for (i) receiving a high definition (HD) digital video stream that comprises a sequence of digital video pictures, wherein a plurality of the digital video pictures in the sequence has associated closed captioning data in a first format in the HD digital video, and (ii) extracting the closed captioning data from the HD digital video stream;
  a set of storages for storing (i) the digital video pictures as a video clip and (ii) the extracted closed captioning data in a second format that is different from the first format; and
  an editing module for (i) performing editing operations on the digital video pictures and (ii) generating a new digital video clip.

26. The non-transitory computer readable medium of claim 25, wherein the capture module extracts the closed captioning data by identifying which of the digital video pictures has associated closed captioning data and extracting the closed captioning data from the digital video pictures that include the associated closed captioning data.

27. The non-transitory computer readable medium of claim 25, wherein the set of storages comprises a first storage for storing the digital video pictures as a video clip and a second storage for storing the extracted closed captioning data.

28. The non-transitory computer readable medium of claim 25, wherein the set of storages comprises only one storage for storing the digital video pictures and the extracted closed captioning data.

29. The non-transitory computer readable medium of claim 25, wherein the digital video pictures and the extracted closed captioning data are stored in the set of storages as a single file.

30. The non-transitory computer readable medium of claim 25, wherein the capture module is further for receiving the HD digital video stream one digital video picture at a time, wherein for a particular digital video picture the capture module extracts the closed captioning data by:
  determining whether the particular digital video picture includes closed captioning data; and
  when the particular digital video picture includes closed captioning data, extracting the closed captioning data from the particular digital video picture.

31. A non-transitory computer readable medium storing a media editing application that when executed by at least one processing unit processes digital video, the media editing application comprising sets of instructions for:
  receiving a high definition ("HD") digital video comprising video data and closed captioning data that is stored in a first format in the HD digital video;
  extracting the closed captioning data from the HD digital video; and
  storing the extracted closed captioning data in a second format that is different from the first format.

32. The non-transitory computer readable medium of claim 31, wherein the media editing application further comprises a set of instructions for extracting the video data from the HD digital video, wherein the set of instructions for storing the extracted closed captioning data comprises a set of instructions for storing the extracted video data with the extracted closed captioning data in a digital video file using the second format.

33. The non-transitory computer readable medium of claim 31, wherein the set of instructions for storing the extracted closed captioning data comprises a set of instructions for storing the extracted closed captioning data in a track of a digital video file that is different from the HD digital video.

34. A non-transitory computer readable medium storing a media editing application that when executed by at least one processing unit processes digital video, the media editing application comprising sets of instructions for:
  receiving a high definition ("HD") digital video comprising video data and closed captioning data;
  extracting the video data and the closed captioning data from the HD digital video;
  storing the extracted closed captioning data;
  editing the extracted video data;
  providing sequences of the video data, the edited video data, and the extracted closed captioning data;
  receiving edited closed captioning data based on the sequences of the video data and the edited video data; and
  defining another HD digital video based on the edited video data and the edited closed captioning data.

35. The non-transitory computer readable medium of claim 34, wherein the closed captioning data in the received HD digital video is formatted in a first format, wherein the set of instructions for storing the extracted closed captioning data comprises a set of instructions for storing the extracted closed captioning data in a second format that is different from the first format.

36. The non-transitory computer readable medium of claim 34, wherein the set of instructions for storing the extracted closed captioning data comprises a set of instructions for storing the extracted closed captioning data in a track of a digital video file that is different from the received and defined HD digital videos.

37. A non-transitory computer readable medium storing a media editing application that when executed by at least one processing unit processes digital video, the media editing application comprising sets of instructions for:
  editing video data;
  retrieving closed captioning data;
  defining a mapping relationship between the edited video data and the closed captioning data; and
  defining a high definition ("HD") digital video based on said edited video data and said closed captioning data.

38. The non-transitory computer readable medium of claim 37, wherein the media editing application further comprises a set of instructions for outputting the HD digital video comprising the edited video data and the closed captioning data.

39. The non-transitory computer readable medium of claim 37, wherein the mapping relationship specifies how a particular part of the closed captioning data is associated with a particular video picture stored in the HD digital video.

40. A non-transitory computer readable medium storing a media editing application that when executed by at least one processing unit processes digital video, the media editing application comprising sets of instructions for:
  selecting a set of video clips from a storage;
  applying one or more editing operations to the selected video clips to generate a composite video clip, wherein at least one of the selected video clips has associated closed captioning data;
  merging the composite video clip with the closed captioning data for the selected video clips to produce a high definition (HD) digital video stream; and
  outputting the HD digital video stream.

41. The non-transitory computer readable medium of claim 40, wherein the set of instructions for merging the composite video clip with the closed captioning data comprises a set of instructions for mapping the closed captioning data to a plurality of digital video pictures of the composite video clip.

42. The non-transitory computer readable medium of claim 40, wherein the editing operations include defining the composite video clip by specifying (i) portions of the selected video clips that are part of the composite video clip and (ii) an order of the portions for the composite video clip.

43. The method of claim 9, wherein said closed captioning data is stored in a first format in said first HD digital video, wherein said extracted closed captioning data is stored in a second format that is different from the first format.

44. The method of claim 9, wherein said extracted closed captioning data is stored in a track of a digital video file that is different from the first HD digital video.

* * * * *